US009316725B2

(12) United States Patent
Shiki

(10) Patent No.: US 9,316,725 B2
(45) Date of Patent: Apr. 19, 2016

(54) ULTRASOUND DIAGNOSTIC APPARATUS AND METHOD FOR ACQUIRING ULTRASOUND DATA

(75) Inventor: Eiichi Shiki, Tochigi-ken (JP)

(73) Assignees: Kabushiki Kaisha Toshiba, Toky (JP); Toshiba Medical Systems Corporation, Otawara-shi (JP)

( * ) Notice: Subject to any disclaimer, the term of this patent is extended or adjusted under 35 U.S.C. 154(b) by 712 days.

(21) Appl. No.: 11/857,917

(22) Filed: Sep. 19, 2007

(65) Prior Publication Data

US 2008/0154133 A1 Jun. 26, 2008

(30) Foreign Application Priority Data

Sep. 19, 2006 (JP) .................................. 2006-252570

(51) Int. Cl.
*A61B 8/00* (2006.01)
*G01S 7/52* (2006.01)
*G01S 15/89* (2006.01)

(52) U.S. Cl.
CPC ......... *G01S 7/52034* (2013.01); *G01S 7/52077* (2013.01); *G01S 7/52085* (2013.01); *G01S 7/52095* (2013.01); *G01S 15/8993* (2013.01); *G01S 15/894* (2013.01)

(58) Field of Classification Search
CPC ............ G01S 15/8925; G01S 15/8993; G01S 7/52085
USPC ......................................... 600/443, 447, 459
See application file for complete search history.

(56) References Cited

U.S. PATENT DOCUMENTS

| 5,027,658 | A | * | 7/1991 | Anderson | 73/625 |
| 5,186,175 | A | * | 2/1993 | Hirama et al. | 600/447 |
| 5,235,982 | A | * | 8/1993 | O'Donnell | 600/443 |
| 5,417,219 | A | * | 5/1995 | Takamizawa et al. | 600/472 |
| 5,433,202 | A | * | 7/1995 | Mitchell et al. | 600/444 |
| 5,441,052 | A | * | 8/1995 | Miyajima | 600/455 |
| 5,460,180 | A | * | 10/1995 | Klepper et al. | 600/447 |
| 5,517,995 | A | * | 5/1996 | Klepper et al. | 600/437 |

(Continued)

FOREIGN PATENT DOCUMENTS

| JP | 7-8492 | 1/1995 |
| JP | 10-118063 | 5/1998 |

OTHER PUBLICATIONS

The Japan Society of Ultrasonics in Medicine Proceedings of the 55th Meeting, pp. 727-728; Toshihiko Kono, et al.; 1989.

*Primary Examiner* — Michael Rozanski
(74) *Attorney, Agent, or Firm* — Oblon, McClelland, Maier & Neustadt, L.L.P.

(57) ABSTRACT

An ultrasound diagnostic apparatus including an ultrasound probe configured to transmit toward and receive from a three-dimensional region of a subject, a transmitting and receiving unit configured to acquire ultrasound data by a plurality of executions of multibeam forming, comprising forming a plurality of sets of ultrasound data along a plurality of directions by a one-time transmitting and receiving operation of the ultrasound probe, a data synthesizing unit configured to synthesize a plurality of sets of data relating to the ultrasound data acquired during each of said executions, the sets being acquired along a respective plurality of different receiving directions with respect to a transmitting direction, to generate synthesized ultrasound data, and an image data generation unit configured to generate image data on the basis of the synthesized ultrasound data.

21 Claims, 18 Drawing Sheets

(56) References Cited

U.S. PATENT DOCUMENTS

| | | | | |
|---|---|---|---|---|
| 5,546,807 A | * | 8/1996 | Oxaal et al. | 73/606 |
| 5,555,534 A | * | 9/1996 | Maslak et al. | 367/135 |
| 5,560,362 A | * | 10/1996 | Sliwa et al. | 600/439 |
| 5,573,001 A | * | 11/1996 | Petrofsky et al. | 600/447 |
| 5,655,536 A | * | 8/1997 | Takamizawa | 600/447 |
| 5,673,699 A | * | 10/1997 | Trahey et al. | 600/447 |
| 5,676,147 A | * | 10/1997 | Petrofsky et al. | 600/447 |
| 5,678,554 A | * | 10/1997 | Hossack et al. | 600/459 |
| 5,680,863 A | * | 10/1997 | Hossack et al. | 600/459 |
| 5,720,291 A | * | 2/1998 | Schwartz | 600/456 |
| 5,779,641 A | * | 7/1998 | Hatfield et al. | 600/443 |
| 5,840,032 A | * | 11/1998 | Hatfield et al. | 600/443 |
| 5,865,750 A | * | 2/1999 | Hatfield et al. | 600/443 |
| 5,876,342 A | * | 3/1999 | Chen et al. | 600/443 |
| 5,882,309 A | * | 3/1999 | Chiao et al. | 600/459 |
| 5,897,501 A | * | 4/1999 | Wildes et al. | 600/447 |
| 5,899,861 A | * | 5/1999 | Friemel et al. | 600/443 |
| 5,899,863 A | * | 5/1999 | Hatfield et al. | 600/443 |
| 5,904,652 A | * | 5/1999 | Gilbert et al. | 600/447 |
| 5,904,653 A | * | 5/1999 | Hatfield et al. | 600/454 |
| 5,934,288 A | * | 8/1999 | Avila et al. | 600/443 |
| 5,951,479 A | * | 9/1999 | Holm et al. | 600/447 |
| 5,954,653 A | * | 9/1999 | Hatfield et al. | 600/443 |
| 5,964,708 A | * | 10/1999 | Freeman et al. | 600/447 |
| 6,005,916 A | * | 12/1999 | Johnson et al. | 378/87 |
| 6,014,473 A | * | 1/2000 | Hossack et al. | 382/294 |
| 6,030,344 A | * | 2/2000 | Guracar et al. | 600/447 |
| 6,036,646 A | * | 3/2000 | Barthe et al. | 600/459 |
| 6,048,312 A | * | 4/2000 | Ishrak et al. | 600/443 |
| 6,048,313 A | * | 4/2000 | Stonger | 600/443 |
| 6,059,729 A | * | 5/2000 | Stonger | 600/443 |
| 6,086,539 A | * | 7/2000 | Guracar et al. | 600/453 |
| 6,093,149 A | * | 7/2000 | Guracar et al. | 600/447 |
| 6,102,858 A | * | 8/2000 | Hatfield et al. | 600/443 |
| 6,102,861 A | * | 8/2000 | Avila et al. | 600/443 |
| 6,102,864 A | * | 8/2000 | Hatfield et al. | 600/454 |
| 6,102,865 A | * | 8/2000 | Hossack et al. | 600/459 |
| 6,126,603 A | * | 10/2000 | Hatfield et al. | 600/454 |
| 6,132,376 A | * | 10/2000 | Hossack et al. | 600/443 |
| 6,183,419 B1 | * | 2/2001 | Wildes | 600/459 |
| 6,201,900 B1 | * | 3/2001 | Hossack et al. | 382/294 |
| 6,208,189 B1 | * | 3/2001 | Freeman et al. | 327/277 |
| 6,213,948 B1 | * | 4/2001 | Barthe et al. | 600/445 |
| 6,222,948 B1 | * | 4/2001 | Hossack et al. | 382/294 |
| 6,248,073 B1 | * | 6/2001 | Gilbert et al. | 600/447 |
| 6,258,029 B1 | * | 7/2001 | Guracar et al. | 600/443 |
| 6,269,262 B1 | * | 7/2001 | Kandori et al. | 600/409 |
| 6,277,075 B1 | * | 8/2001 | Torp et al. | 600/443 |
| 6,306,092 B1 | * | 10/2001 | Yamrom et al. | 600/447 |
| 6,312,381 B1 | * | 11/2001 | Knell et al. | 600/437 |
| 6,322,511 B1 | * | 11/2001 | Guracar et al. | 600/453 |
| 6,325,759 B1 | * | 12/2001 | Pelissier | 600/443 |
| 6,360,027 B1 | * | 3/2002 | Hossack et al. | 382/294 |
| 6,374,674 B1 | * | 4/2002 | Mine | 73/606 |
| 6,413,219 B1 | * | 7/2002 | Avila et al. | 600/443 |
| 6,423,004 B1 | * | 7/2002 | Dong et al. | 600/443 |
| 6,436,039 B1 | * | 8/2002 | Lannutti et al. | 600/437 |
| 6,464,638 B1 | * | 10/2002 | Adams et al. | 600/443 |
| 6,468,213 B1 | * | 10/2002 | Knell et al. | 600/437 |
| 6,468,218 B1 | * | 10/2002 | Chen et al. | 600/443 |
| 6,488,625 B1 | * | 12/2002 | Randall et al. | 600/437 |
| 6,497,664 B1 | * | 12/2002 | Randall et al. | 600/447 |
| 6,524,244 B1 | * | 2/2003 | Knell et al. | 600/437 |
| 6,530,885 B1 | * | 3/2003 | Entrekin et al. | 600/437 |
| 6,537,219 B2 | * | 3/2003 | Poland et al. | 600/447 |
| 6,558,326 B2 | * | 5/2003 | Pelissier | 600/443 |
| 6,682,483 B1 | * | 1/2004 | Abend et al. | 600/437 |
| 6,685,644 B2 | * | 2/2004 | Seo et al. | 600/447 |
| 6,749,569 B1 | * | 6/2004 | Pellegretti | 600/441 |
| 6,780,157 B2 | * | 8/2004 | Stephens et al. | 600/466 |
| 6,801,148 B2 | * | 10/2004 | Freeman et al. | 341/143 |
| 6,867,720 B1 | * | 3/2005 | Freeman et al. | 341/143 |
| 6,966,878 B2 | * | 11/2005 | Schoisswohl et al. | 600/443 |
| 6,980,844 B2 | * | 12/2005 | Schoisswohl | 600/407 |
| 6,987,474 B2 | * | 1/2006 | Freeman et al. | 341/143 |
| 7,044,913 B2 | * | 5/2006 | Shiki | 600/454 |
| 7,496,456 B2 | * | 2/2009 | Hiyama et al. | 702/39 |
| 2002/0007119 A1 | * | 1/2002 | Pelissier | 600/443 |
| 2002/0042573 A1 | * | 4/2002 | Hashimoto et al. | 600/443 |
| 2002/0064093 A1 | * | 5/2002 | Chiang et al. | 367/138 |
| 2002/0080683 A1 | * | 6/2002 | Chiang et al. | 367/138 |
| 2002/0145941 A1 | * | 10/2002 | Poland et al. | 367/11 |
| 2002/0173720 A1 | * | 11/2002 | Seo et al. | 600/437 |
| 2003/0028113 A1 | * | 2/2003 | Gilbert et al. | 600/447 |
| 2003/0097068 A1 | * | 5/2003 | Hossack et al. | 600/443 |
| 2003/0125624 A1 | * | 7/2003 | Shiki | 600/443 |
| 2003/0158482 A1 | * | 8/2003 | Poland et al. | 600/446 |
| 2003/0231125 A1 | * | 12/2003 | Freeman et al. | 341/143 |
| 2004/0019278 A1 | * | 1/2004 | Abend | 600/454 |
| 2004/0158154 A1 | * | 8/2004 | Hanafy et al. | 600/446 |
| 2004/0220465 A1 | * | 11/2004 | Cafarella | 600/407 |
| 2004/0267127 A1 | * | 12/2004 | Abend et al. | 600/450 |
| 2005/0049502 A1 | * | 3/2005 | Schoisswohl | 600/453 |
| 2005/0049503 A1 | * | 3/2005 | Schoisswohl et al. | 600/453 |
| 2005/0075573 A1 | * | 4/2005 | Park et al. | 600/459 |
| 2005/0154303 A1 | * | 7/2005 | Walker et al. | 600/443 |
| 2005/0219096 A1 | * | 10/2005 | Freeman et al. | 341/143 |
| 2005/0251044 A1 | * | 11/2005 | Hoctor et al. | 600/444 |
| 2005/0277835 A1 | * | 12/2005 | Angelsen et al. | 600/437 |
| 2006/0052699 A1 | * | 3/2006 | Angelsen et al. | 600/437 |
| 2006/0161062 A1 | * | 7/2006 | Arditi et al. | 600/443 |
| 2006/0184032 A1 | * | 8/2006 | Shiki | 600/454 |
| 2007/0038091 A1 | * | 2/2007 | Shiki | 600/437 |
| 2008/0249405 A1 | * | 10/2008 | Kakee | 600/437 |

* cited by examiner

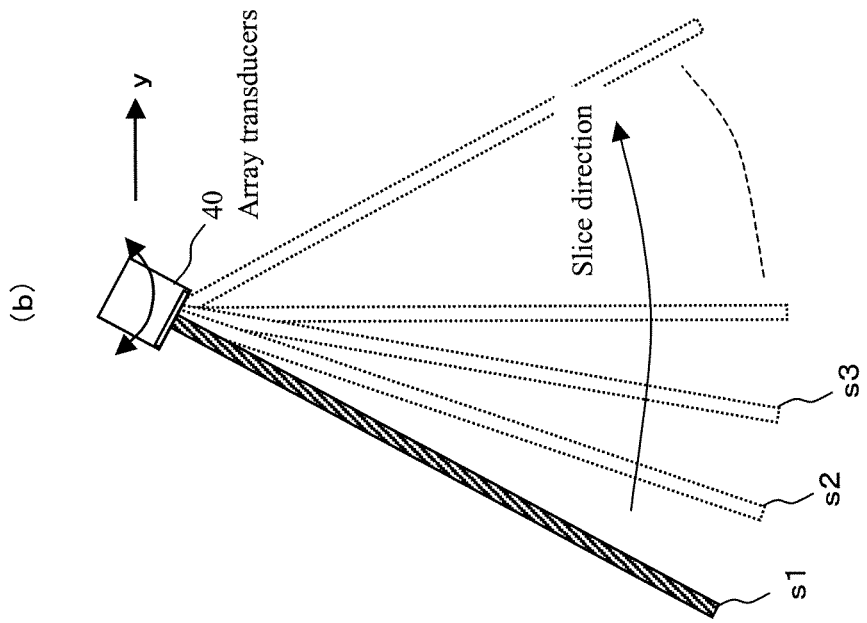
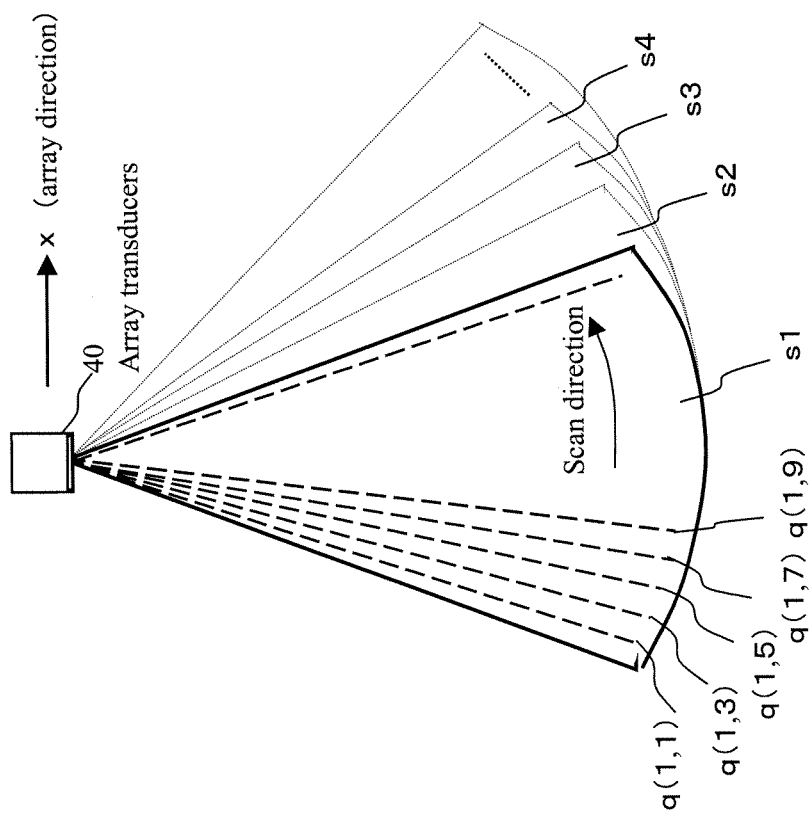

ULTRASOUND DIAGNOSTIC APPARATUS AND METHOD FOR ACQUIRING ULTRASOUND DATA

CROSS REFERENCE TO RELATED APPLICATIONS

This application is based upon and claims the benefit of priority from prior Japanese Patent Application No. 2006-252570, filed on Sep. 19, 2006, the entire contents of which are incorporated herein by reference.

BACKGROUND OF THE INVENTION

An ultrasonic diagnostic apparatus transmits ultrasonic waves generated by array transducers in an ultrasonic probe to a subject and displays images based on ultrasonic waves reflected from boundary surfaces of acoustic impedance. An ultrasonic diagnostic apparatus is extensively used in function diagnosis and conformation diagnosis of organs because it is easy to acquire diagnostic images.

By the most popular scan manner of the ultrasonic diagnostic apparatus, array transducers arranged in a row are driven electrically and ultrasonic images are acquired. Lately, 3-dimensional image data can be acquired by a 2-dimensional array probe or a mechanical oscillation 1-dimension array probe. Volume rendering images or MPR (multi plane reconstruction) images can be obtained by reconstruction of the 3 dimensional image data.

However, because the many scan lines in the above-mentioned acquisition of the 3-dimensional image data require much more time than 2-dimensional image data because of many scan lines. Therefore, it is very difficult to balance time resolution and space resolution.

One solution for this problem, the multibeam forming method. has been invented and used. With the multibeam forming method, a plurality of scan lines can be simultaneously acquired along a plurality of directions. In this method, delay calculations for signals acquired by one transmitting and receiving are executed more than once and each delay calculation corresponds to a distinctive direction of the scan line. The multibeam forming method is a very effective method for generating a 3-dimensional image data.

However, the multibeam forming method has a defect. By this method, because center axis of the transmitting ultrasonic beam and the receiving ultrasound beam are ordinarily different, not only reduction of transmitting and receiving sensitivity but also strain of ultrasonic beam occurs. In addition, when the distance between the transmitting beam axis and each receiving beam axis is different, transmitting and receiving sensitivity is different in accordance with the directions of the receiving beam. In other words, 3-dimensional image data acquired by the multibeam forming method includes considerable artifacts. This defect is also described in Japanese patent disclosure (kokai) No. 11-118063.

FIGS. 17(a) and (b) are frame formats showing a transmitting beam (continuous line) and receiving beams (dashed line) in the multibeam forming method. The transmitting beam is focused at a predetermined depth. On the other hand, focusing of the receiving beam can be kept narrow along the depth direction by dynamic focus.

In this case, the receiving sensitivity of ultrasound is expressed by multiplication of a transmitting acoustic field and a receiving acoustic field. Then in the focused area of the transmitting beam, the transmitting acoustic field affects the receiving acoustic field. Accordingly, as shown by Btr-1 in FIG. 17(b), beam bending to the center direction is generated. Strain of the image occurs by image generation from transmitting and receiving beams having such beam bending.

FIG. 18 is a view showing a frame format of an acoustic field of transmitting and receiving by multibeam forming. The acoustic pressure at end of a transmitting field is less than the acoustic pressure at center of the field. This phenomenon makes the receiving sensitivity uneven and causes stripe patterns in the ultrasonic image acquired by the uneven field. In addition, the reduction of sensitivity causes deterioration of sharpness of the ultrasound image.

Furthermore, time phase difference is affected by the stripe pattern. Between receiving beams in one multibeam forming, the signal of the receiving beams is received simultaneously. However, between a receiving beam in one multibeam forming and a receiving beam in another multibeam forming, the sets of signals of the receiving beams are received at different times. With such time phase difference, the subject and ultrasound probe cannot be kept completely static. Then, in boundary lines between sets of multibeam forming, the signal is discontinuous. Because such discontinuity appears in every predetermined number of receiving beams, the discontinuity is easy to recognize.

BRIEF SUMMARY OF THE INVENTION

According to one aspect of the present invention, there is provided an ultrasound diagnostic apparatus including an ultrasound probe configured to transmit toward and receive from a three-dimensional region of a subject, a transmitting and receiving unit configured to acquire ultrasound data by a plurality of executions of multibeam forming, comprising forming a plurality of sets of ultrasound data along a plurality of directions by a one-time transmitting and receiving operation of the ultrasound probe, a data synthesizing unit configured to synthesize a plurality of sets of data relating to the ultrasound data acquired during each of said executions, the sets being acquired along a respective plurality of different receiving directions with respect to a transmitting direction, to generate synthesized ultrasound data, and an image data generation unit configured to generate image data on the basis of the synthesized ultrasound data.

According to another aspect of the present invention there is provided a method of acquiring ultrasound data including transmitting and receiving an ultrasonic signal toward and from a three-dimensional region of a subject, acquiring ultrasound data by a plurality of executions of multibeam forming, comprising forming a plurality of sets of ultrasound data along a plurality of directions by a one-time transmitting and receiving operation, synthesizing a plurality of sets of data relating to the ultrasound data acquired during said operations, the sets being acquired along a respective plurality of different receiving directions with respect to a transmitting direction, to generate synthesized ultrasound data, and generating image data on the basis of the synthesized ultrasound data.

BRIEF DESCRIPTION OF THE SEVERAL VIEWS OF THE DRAWING

A more complete appreciation of the invention and many of the attendant advantages thereof will be readily obtained as the same becomes better understood by reference to the following detailed description when considered in connection with the accompanying drawings, wherein:

FIGS. 6(a) and 6(b) are frame formats showing the positional relationship of ultrasound data acquisition of a first exemplary embodiment of the ultrasound diagnostic apparatus of the invention.

DETAILED DESCRIPTION OF THE PREFERRED EMBODIMENTS

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

First Exemplary Embodiment

In a first exemplary embodiment of the present invention, multibeam forming is executed with controlling delay time for received signals acquired by 1-dimension array vibrator elements in an ultrasonic probe. Two-dimension ultrasonic images along a slice direction intersecting with a scan direction are acquired by oscillating the vibrator elements along the slice direction. Three-dimensional ultrasonic image data is acquired as above.

In addition, in the following explanation of the first exemplary embodiment, 3-dimensional data is acquired by mechanically oscillating the sector scan probe. However, the 3-dimensional data may be acquired in a linear or convex scan manner. Also, 3-dimensional data may be acquired by a 2-dimensional array probe having 2-dimensionally arrayed array transducers.

(Components)

Figure 1:
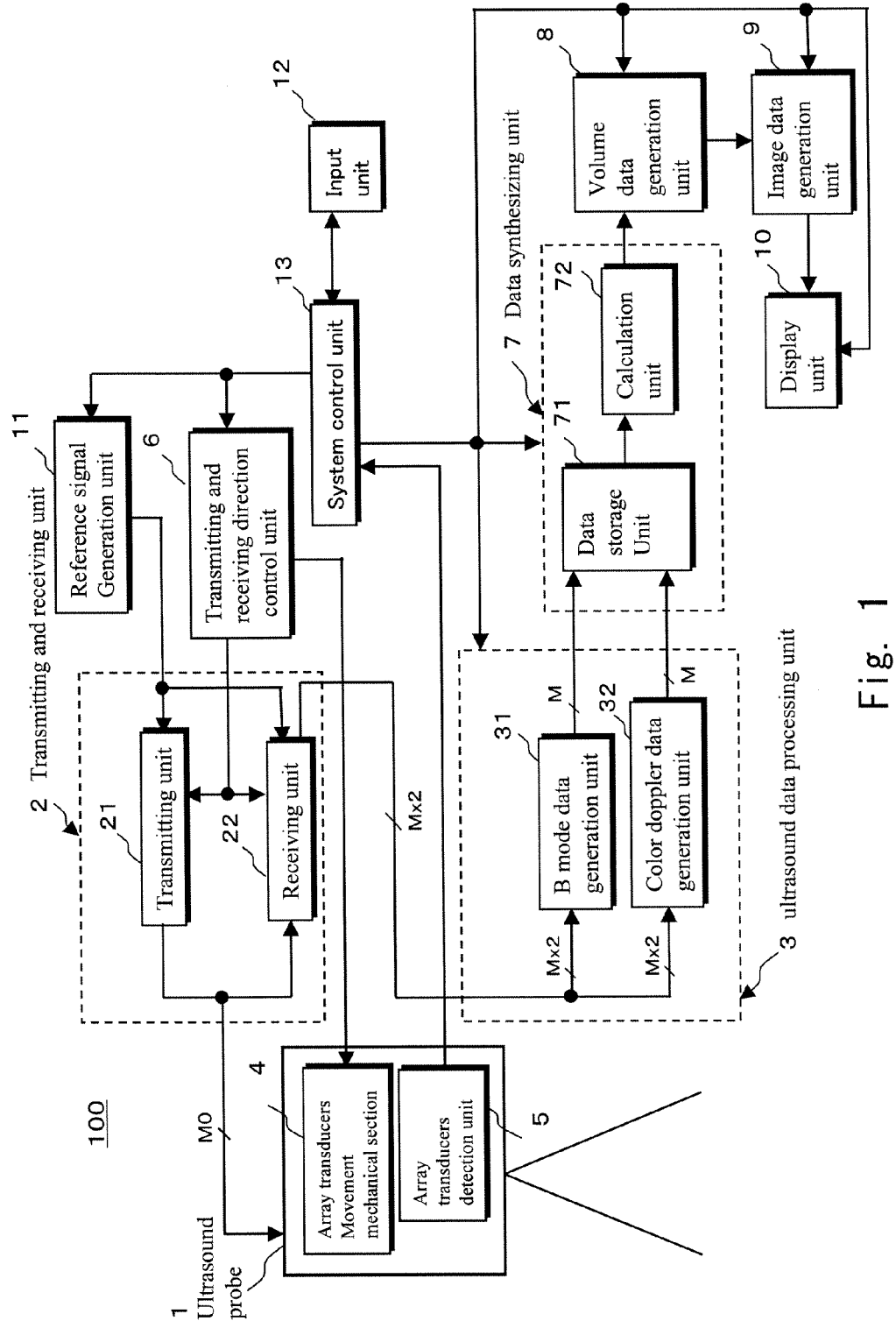
FIG. 1 is a block diagram showing whole components of a first exemplary embodiment of the ultrasound diagnostic apparatus of the invention.
Figure 2:
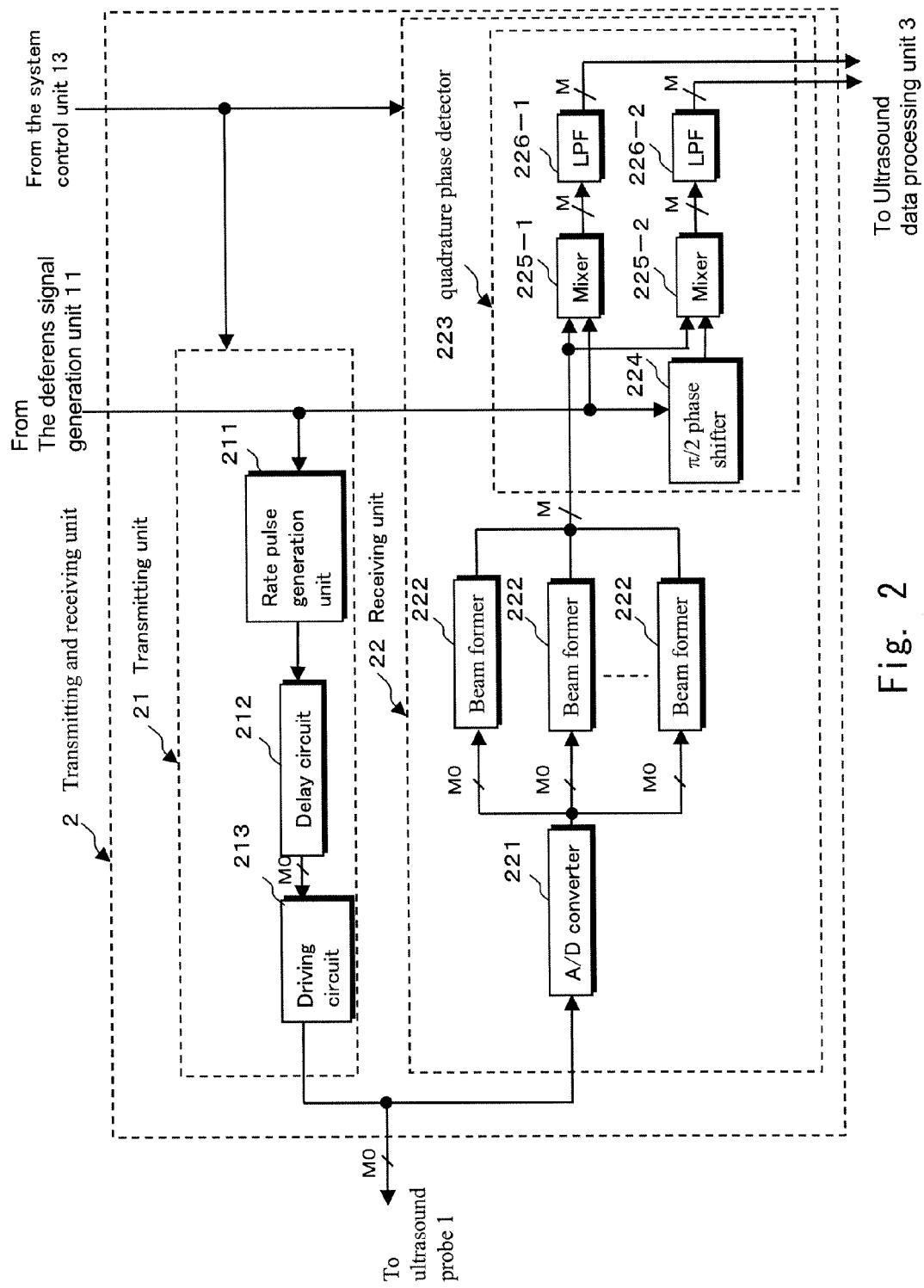
FIG. 2 is a block diagram showing components of a transmitting and receiving unit of a first exemplary embodiment of the ultrasound diagnostic apparatus of the invention.
Figure 4:
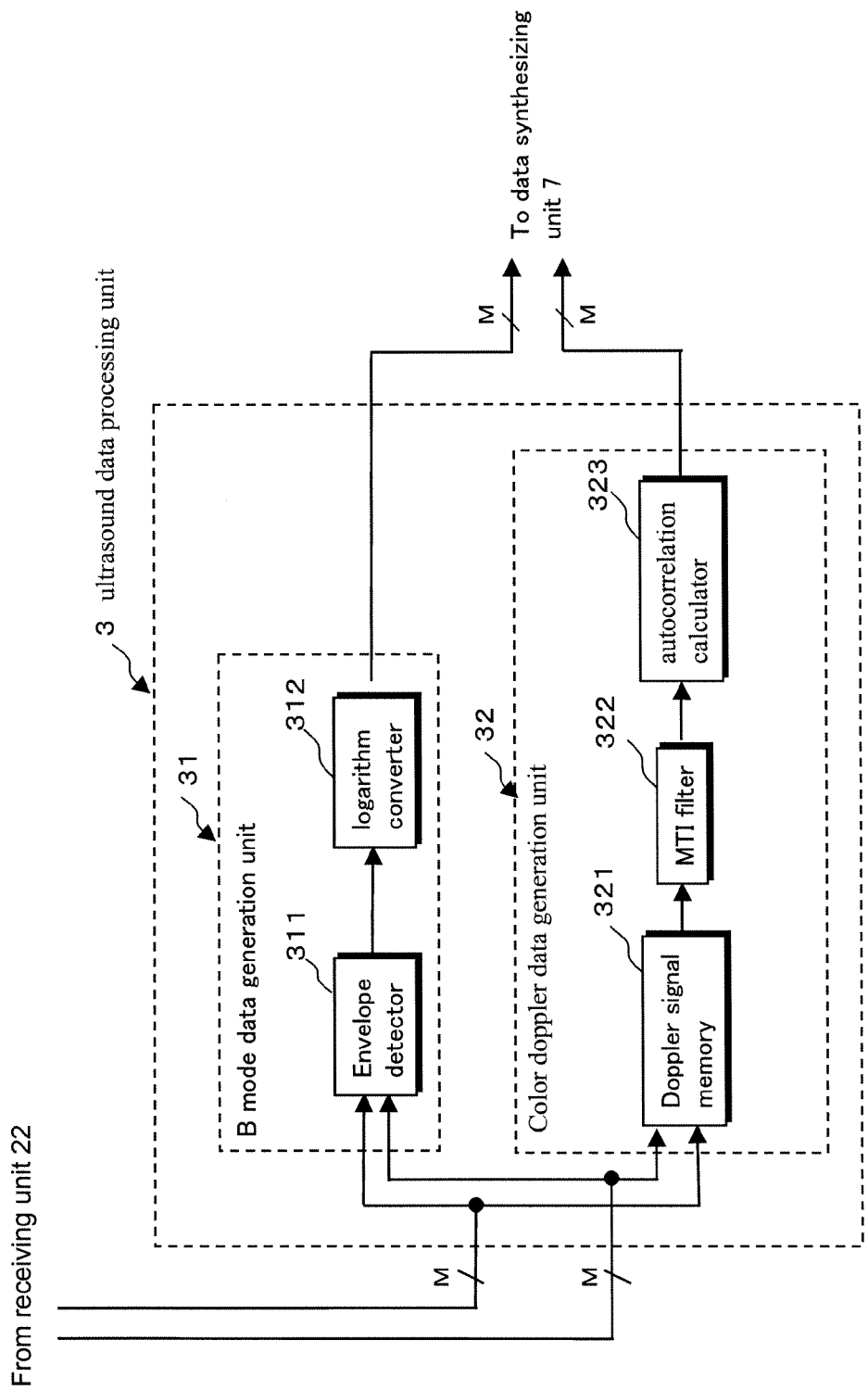
FIG. 4 is a block diagram showing components of an ultrasound data processing unit of a first exemplary embodiment of the ultrasound diagnostic apparatus of the invention.

FIG. 1 is a block diagram showing the components of the first exemplary embodiment of the invention. FIG. 2 and FIG. 4 are block diagrams showing components included in a transmitting and receiving unit and an ultrasound data processing unit of the exemplary embodiment.

An ultrasonic diagnostic apparatus shown in FIG. 1 includes an ultrasonic probe 1, a transmitting and receiving unit 2, an ultrasonic data processing unit 3, a probe movement mechanical section 4 and an array transducers detection unit 5. The ultrasonic probe 1 has 1-dimensionally arrayed vibrator elements for sector scan and transmit and receive to/from a subject. The transmitting and receiving unit 2 delivers a driving signal to the ultrasonic probe 1, delays the received signal and adds the delayed signal. The ultrasonic data processing unit 3 generates B mode data or color Doppler data by processing the received signal acquired from the transmitting and receiving unit 2. The probe movement mechanism section 4 oscillates the array transducers along a slice direction crossing with a scan direction mentioned below. The array transducers detection unit 5 detects a position of the oscillated vibrator elements.

The ultrasonic diagnostic apparatus also includes a transmitting and receiving direction control unit 6, a data synthesizing unit 7 and a volume data generation unit 8. The transmitting and receiving direction control unit 6 controls beam directions along the scan direction and the slice direction in the 3-dimensional region of the subject. The data synthesizing unit 7 synthesizes acquired ultrasound data in accordance with positions along the scan direction and the slice direction. The volume data generation unit 8 generates volume data from the synthesized ultrasound data.

Furthermore, the ultrasonic diagnostic apparatus includes an image data generation unit 9, a display unit 10, a reference signal generation unit 11, an input unit 12 and a system control unit 13. The image data generation unit 9 generates 2-dimensional or 3-dimensional images modified in accordance with a desired format. The display unit 10 displays the generated image. The reference signal generation unit 11 generates pulse waves or continuous waves having the same frequency as the center frequency of transmitting ultrasound waves for the transmitting and receiving unit 2. Information of the subject or initial settings of apparatus or command signal are inputted by the input unit 12. The system control unit 13 controls the above mentioned various units.

A surface of the ultrasonic probe 1 is contacted to the subject and executes transmitting and receiving ultrasonic waves. For example, the array transducers are provided in probe case containing coupling liquid. The array transducers are electric-sound transducers. When the ultrasonic wave is transmitted, the array transducers convert an electrical drive signal to a transmit ultrasonic wave and when the reflected ultrasound wave is received, the array transducers convert the received reflected wave to an electric signal.

The transmitting and receiving unit 2 includes a transmitting unit 21 supplying drive signals to the array transducers and a receiving unit 22 executing the multibeam forming by delaying and adding signals received by the array transducers Furthermore, as shown in FIG. 2, transmitting unit 21 includes a rate pulse generation unit 211, a delay circuit 212 and a drive circuit 213. The rate pulse generation unit 211 generates a rate pulse setting the rate cycle of the transmitted ultrasound waves by dividing a continuous wave supplied from the reference signal generation unit 11. The delay circuit 212 consists of the same number of independent delay lines as the array transducers. The delay circuit 212 delays the rate pulse so that the transmitted wave is focused in accordance with a predetermined depth and direction supplied from the transmitting and receiving direction control unit 6. The drive circuit 213 has the same number of independent drive circuits as the array transducers and generates drive pulses for driving the array transducers on the basis of the above mentioned delayed rate pulses.

The receiving unit 22 includes an A/D converter 221, beam formers 222 and a quadrature phase detector 223. The received signal from the ultrasound probe 1 is delivered to the beam formers 222 after digital conversion by the A/D converter 221. Each of the beam formers 222 has a receiving delay circuit and an adding circuit. The receiving delay circuit delays the digital converted signal so that the added signal has directivity and is focused at a predetermined depth on the basis of a scan control signal from the transmitting and receiving direction control unit 6.

The quadrature phase detector 223 includes a $\pi/2$ phase shifter 224, mixers 225 and low pass filters 226. The quadrature phase detector 223 executes orthogonal detection to the added received signals delivered from the beam formers 222 and generates complex receiving signals.

Figure 3:
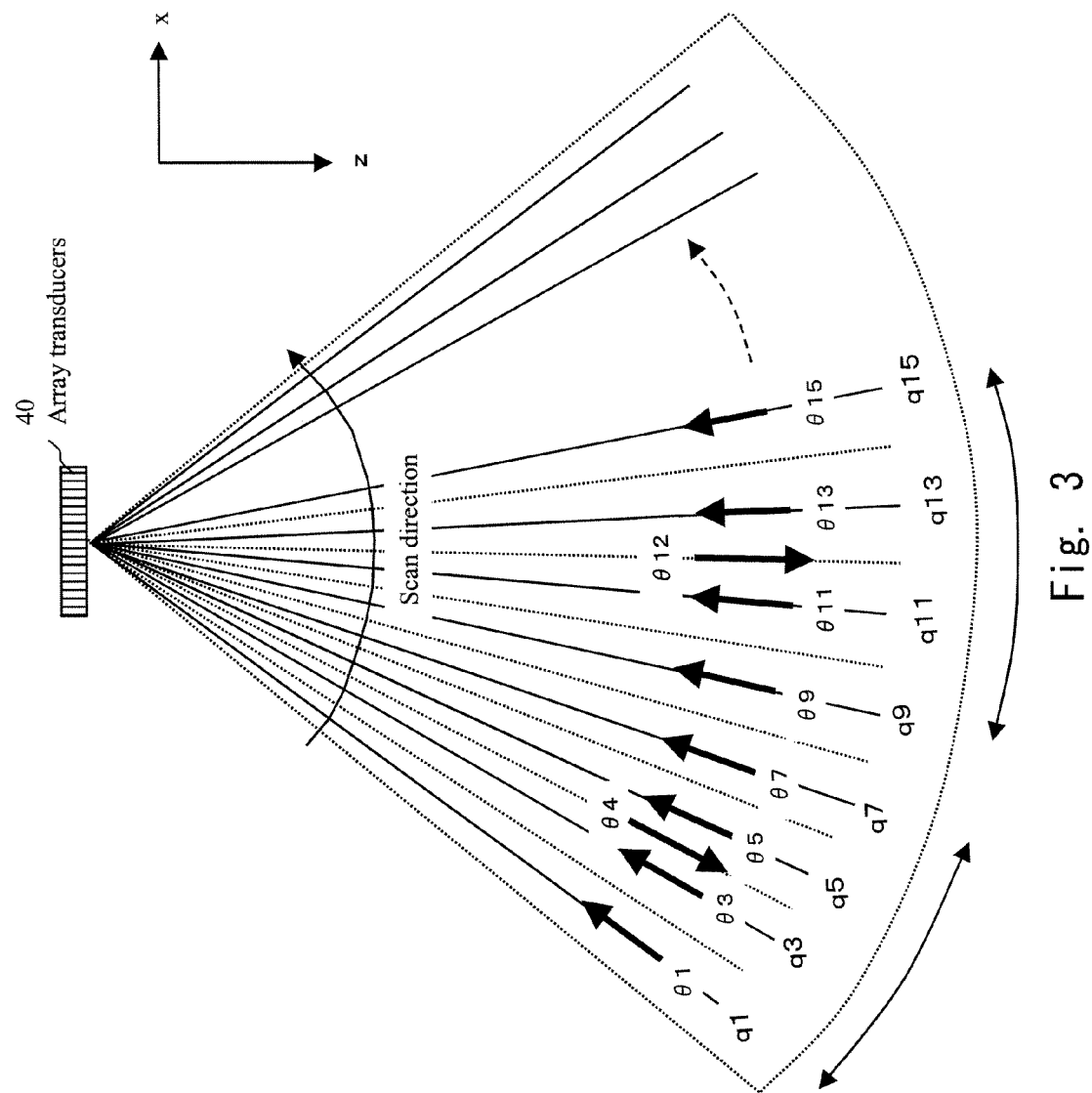
FIG. 3 is a frame format showing transmitting and receiving directions for multibeam forming of a first exemplary embodiment of the ultrasound diagnostic apparatus of the invention.

Next, transmitting and receiving direction control of multibeam-forming set by delay control of the transmitting delay circuits 212 and the beam formers 222 is explained with reference to FIG. 3. As an example, a case that the number of multibeam forming is 4 directions is explained, but this number can be changed arbitrarily. FIG. 3 shows the directions of receiving and transmitting in the case that number of multibeam forming is 4 and a scan type is the sector scan. However, the present invention is not limited to this case. An X direction of FIG. 3 corresponds to an array direction of the array transducers of the ultrasound probe 1 and a Y direction of FIG. 3 corresponds to a direction that is perpendicular to the array direction.

The array transducers are supplied with the delay signal from the driving circuit 213 of the transmitting unit 21 and sequentially transmit ultrasound waves along directions indicated by $\theta 4$ and $\theta 12$, further $\theta 20$, $\theta 28$, $\theta 36$ (not shown) on a predetermined cycle. Also, the array transducers simultaneously receive reflected ultrasound waves caused by transmitting wave $\theta 4$ along directions indicated by $\theta 1$, $\theta 3$, $\theta 5$ and $\theta 7$ in accordance with the multibeam forming manner. By the same manner, 4-direction multibeam forming is executed in the cases of $\theta 12$, $\theta 20$ and so on.

Ultrasound data q1, q3, q5 . . . is generated from the reception signal acquired from directions $\theta 1$, $\theta 3$, $\theta 5$ . . . . Furthermore, volume data or image data is generated from this ultrasound data. Therefore, because only one time transition is required for acquiring ultrasound data of directions $\theta 1$, $\theta 3$, $\theta 5$ and $\theta 7$, the time required for acquiring ultrasound data is cut to a quarter and time resolution of volume images is improved.

FIG. 4 is a block diagram showing detailed component of the ultrasound data processing unit 3. The ultrasound data processing unit 3 includes a B mode data generation unit 31 and a color Doppler data generation unit 32.

The B mode data generation unit 31 includes an envelope detector 311 which calculates envelope curve of the complex received signals supplied from the quadrature phase detector 223 and a logarithm converter 312 which converts the detected envelope curve to B mode data.

The Doppler data generation unit 32 includes a Doppler signal memory 321 which stores the complex receiving signal, an MTI filter 322 which removes clatter signal caused from whole movement of the subject and an autocorrelation calculator 323 which calculates autocorrelation between sets of the filtered received signals stored in the Doppler signal memory 321 and generates color Doppler data indicating the velocity of blood.

Figure 5:
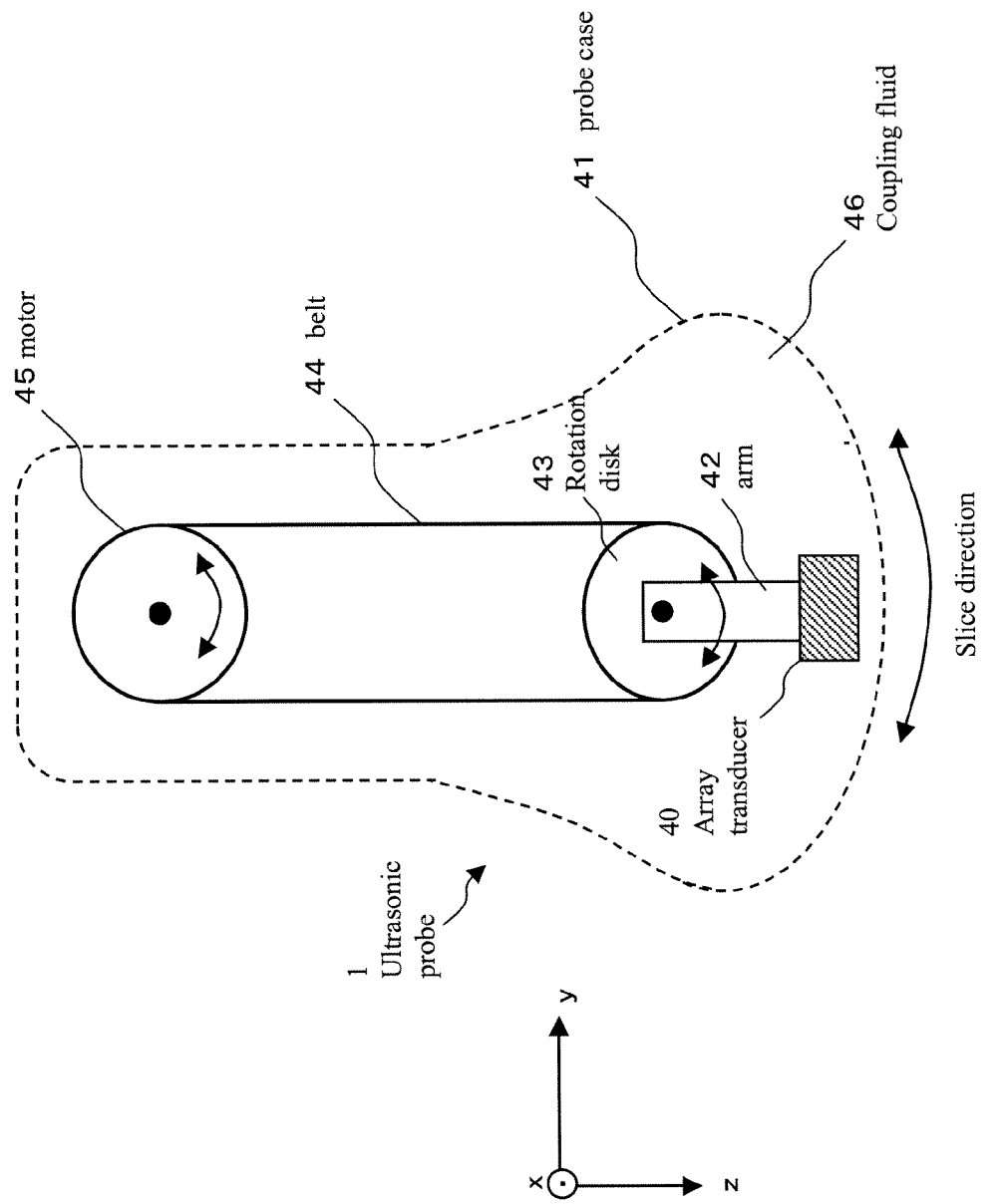
FIG. 5 is a frame format showing the components of an array transducers movement mechanical section of a first exemplary embodiment of the ultrasound diagnostic apparatus of the invention.

FIG. 5 is a frame format showing a concrete example of the probe movement mechanical section 4 shown in FIG. 1. The probe movement mechanical section 4 has a function for oscillating array transducers 40 provided near the top of a probe case 41 along a slice direction that is perpendicular to the scan direction. Coupling fluid fills the probe case 41. The probe movement mechanical section 4 includes an arm 42 to which the vibrator elements 40 are fixed at one end thereof, a rotating disc 43 which is fixed in the other end of the arm 42, a belt 44, and a motor 45 which is coupled to the rotation disc 43 by the belt 44. Furthermore, motor 45 rotates along the direction shown by the arrows in FIG. 5 in accordance with a probe movement control signal supplied from the transmitting and receiving direction control unit 6. The rotation movement of the motor 45 is transmitted to the rotation disk 43, the belt 44 and the array transducers 40 fixed at the end of the arm 42 and oscillating along the slice direction.

FIG. 6(a) and FIG. 6(b) are frame formats showing the method of acquiring volume data. Two-dimension data s1 is acquired by above mentioned scan manner. In FIG. 6(b), q (N,M) indicates nth ultrasound data of $\theta$(M) shown in FIG. 3. Two-dimensional data in the X-Z plane is acquired as above. Then FIG. 6(b) shows ultrasound beam directions along the slice direction that the array transducers oscillate along. By the oscillation, a plurality of set of 2-dimensional data S(n) can be acquired in accordance with the slice direction which is perpendicular to the 2-dimensional data S(n) at a predetermined interval. By such manner, 3-dimensional data (volume data) can be obtained.

Returning to FIG. 1, the array transducers detection unit 5 detects position information (information relating position and angle) of array transducers 40 oscillated by the probe movement mechanical section 4 by a not shown an encoder included in the array transducers detection unit 5. For example, the encoder is provided on the rotation axis of the motor 45 of the probe movement mechanical section 4, and the position information is detected on the basis of rotation angle of the rotation axis detected by the encoder. Then the system control unit 13 delivers the detected position information to the data synthesizing unit 7.

The transmitting and receiving direction control unit 6 sets directions of transmitting and multibeam forming by controlling the delay time the beam formers 222 in the receiving unit 22 and the delay circuits 212. Furthermore the transmitting and receiving direction control unit 6 controls the array transducers 40 to scan along the slice direction by controlling of the probe movement mechanical section.

Figure 7:
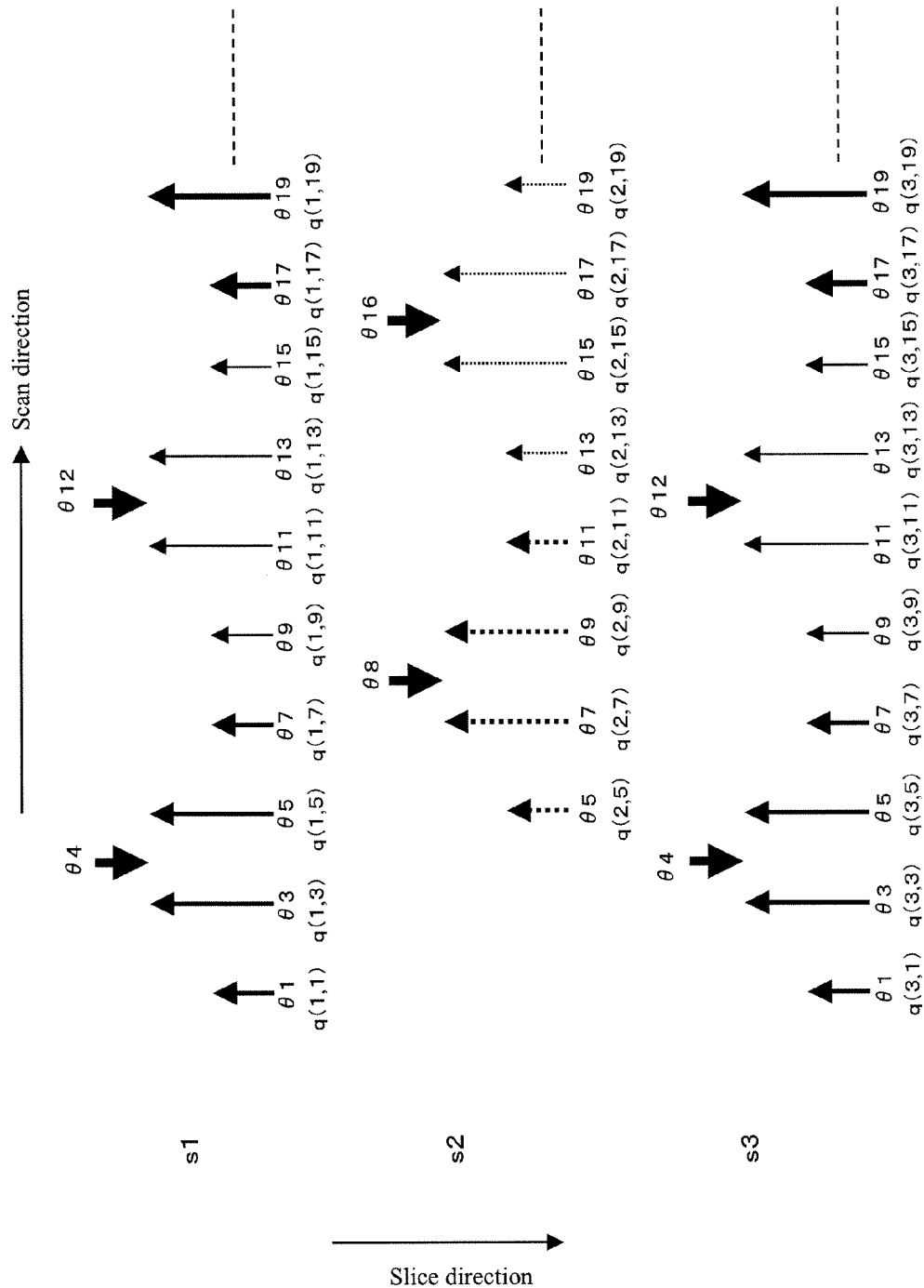
FIG. 7 is a frame format showing generation of ultrasound data of a first exemplary embodiment of the ultrasound diagnostic apparatus of the invention.

FIG. 7 is a frame format showing method of generating ultrasound data by controlling the transmitting and receiving direction control unit 6. The horizontal axis corresponds to the scan direction and the longitudinal axis corresponds to the slice direction. Two-dimensional data s1 is constructed from ultrasound data q (1,1), q (1,3), q (1,5) and q (1,7) acquired by transmitting along θ4 and multibeam forming of θ1, θ3, θ5 and θ7 and from ultrasound data q (1,9), q (1,11), q (1,13) and q (1,15) acquired by transmitting along θ12 and multibeam forming of θ9, θ11, θ13 and θ15 and so on.

Two-dimensional data s2 neighboring to s1 is constructed from ultrasound data q (2,5), q (2,7), q (2,9) and q (2,11) acquired by transmitting along 08 and multibeam forming of θ5, θ7, θ9 and θ11 and from ultrasound data q (2,13), q (2,15), q (2,17) and q (2,19) acquired by transmitting along θ12 and multibeam forming of θ13, θ15, θ17 and θ19 and so on. Two-dimensional data s3 neighboring to s2 is constructed from ultrasound data q (3,1), q (3,3), q (3,5) and q (3,7) acquired by transmitting along θ4 and multibeam forming of θ1, θ3, θ5 and θ7 and from ultrasound data q (3,9), q (3,11), q (3,13) and q (3,15) acquired by transmitting along θ12 and multibeam forming of θ9, θ11, θ13 and θ15 and so on.

The transmitting direction is shifted at predetermined intervals along the scan direction. For example, in an odd number slice, ultrasound data begins from acquiring data by transmitting along direction θ4 and receiving along directions θ1, θ3, θ5 and θ7. In an even number slice, ultrasound data begins from acquiring data by transmitting along direction θ8 and receiving along directions θ5, θ7, θ9 and θ11.

Returning to FIG. 1 again, the data synthesizing unit 7 includes a data storage unit 71 and a calculation unit 72. The data storage unit 71 stores at least a plurality of sets of ultrasound data of the 2-dimensional data neighboring each other. Each set of ultrasound data of the 2-dimensional data is related to position information of the 2-dimensional data supplied from array transducers detection unit 5 and information of receiving directions supplied from transmitting and receiving direction control unit 6 as attendant information.

The calculation unit 72 reads out the ultrasound data and the attendant information of a predetermined region from 3-dimensional ultrasound data stored in the data storage unit 71. Then the calculation unit 72 synthesizes the read out ultrasound data along the scan direction and the slice direction and calculates position information of the synthesized ultrasound data on the basis of the position information of the unsynthesized ultrasound data. The calculation unit 72 supplies the synthesized ultrasound data and its position information to the volume data generation unit 8.

The volume data generation unit 8 includes a memory and stores the synthesized ultrasound data supplied from the calculation unit 72 in the memory in accordance with the position information added to the ultrasound data. In this manner, the volume data generation unit 8 generates volume data.

Figure 8:
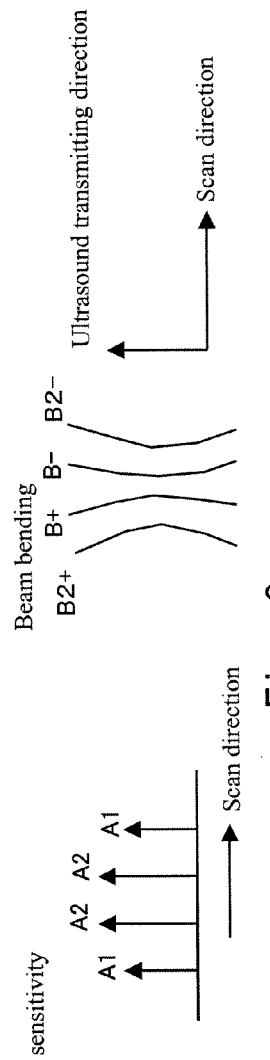
FIG. 8 is a chart showing the character of ultrasound data of a first exemplary embodiment of the ultrasound diagnostic apparatus of the invention.

Next, synthesizing of the ultrasound data generated by the ultrasound data processing unit 3 executed by the data synthesizing unit 7 is explained with reference to FIG. 8 and FIG. 9. FIG. 8 is a frame format showing the character of 2-dimension data s1, s2 and s3 stored in the data storage unit 71 of the data synthesizing unit 7. Each of q (1,1), q (1,3), q (1,5), . . . composing 2-dimensional data s1; q (2,5), q (2,7), q (2,9), . . . composing 2-dimensional data s2; and q (3,1), q (3,3), q (3,5), . . . composing 2-dimensional data s3 has uneven receiving sensitivity and beam bending as explained with reference to FIG. 16 and FIG. 17. In FIG. 8, receiving sensitivity A2 indicates receiving sensitivity of an inner receiving direction near to a transmitting direction and receiving sensitivity A1 indicates receiving sensitivity of outer an receiving direction far from a transmitting direction. Normally A1 is smaller than A2.

Beam bending B+ and B− indicate beam bending of the inner receiving direction near to a transmitting direction and beam bending B2+ and B2− indicate beam bending of the outer receiving direction far from a transmitting direction. Normally, the absolute value of B+ equals the absolute value of B−, the absolute value of B2+ equals the absolute value of B2− and the absolute values of B+, B− are smaller than the absolute values of B2+, B2− respectively.

Figure 9:
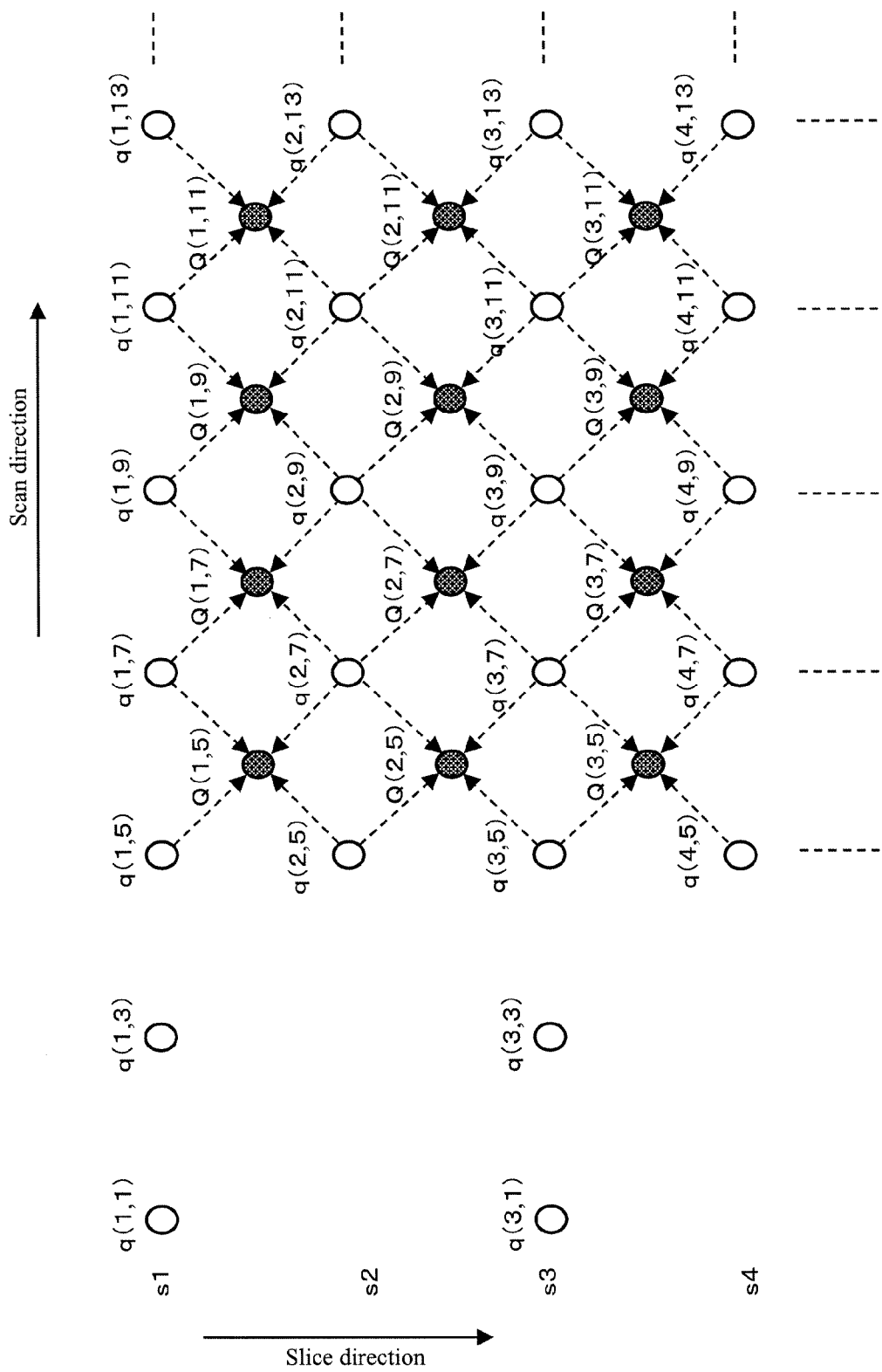
FIG. 9 is a frame format showing synthesizing processing of ultrasound data of a first exemplary embodiment of the ultrasound diagnostic apparatus of the invention.

In addition, FIG. 9 is a frame format showing synthesizing performed by the calculation unit 72 in the data synthesizing unit 7. The data storage unit 71 stores ultrasound data q (1,1), q (1,3), q (1,5), . . . composing 2-dimensional data s1, q (2,5), q (2,7), q (2,9), . . . composing 2-dimensional data s2 and q (3,1), q (3,3), q (3,5), composing 2-dimensional data s3. The calculation unit 72, for example, generates Q (1,5) by reading out and synthesizing sets of ultrasound data of q (1,5), q (1,7), q (2,5) and q (2,7). Furthermore, the calculation unit 72 calculates a center position between q (1,5), q (1,7), q (2,5) and q (2,7) on the basis of position information attendant to the ultrasound data q (1,5), q (1,7), q (2,5) and q (2,7). The ultrasound data Q (1,5) is related to its position information and stored in the memory of volume data generation unit 8.

The synthesizing is simply averaging or adding when the synthesized ultrasound data is treated as data for a center direction of the receive directions in this exemplary embodiment. In addition, a format of the volume data is the orthogonal coordinate system (U, V, W) of a 3-dimensional space where values are set at intervals (δu, δu, δu). Normally, the synthesized ultrasound data generated along polar coordinates is 3-dimensional scan converted and the volume data along the orthogonal coordinate system is generated.

In this manner, the calculation unit 72 also generates ultrasound data Q (1,7) by synthesizing q (1,7), q (1,9), q (2,7) and q (2,9), ultrasound data Q (1,9) by synthesizing q (1,9), q (1,11), q (2,9) and q (2,11), ultrasound data Q (2,5) by synthesizing q (2,5), q (2,7), q (3,5) and q (2,7) which are in neighboring 2-dimension data s2 and s3, ultrasound data Q (2,7) by synthesizing q (2,7), q (2,9), q (3,7) and q (2,9) . . . etc. Furthermore, this synthesizing executed between 2-dimensional data s3 and s4, between s4 and s5 . . . etc. The memory of volume data generation unit stores ultrasound data acquired by synthesizing q (1,5), q (1,7), q (1,9), q (1,11) . . . q (2,5), q (2,7), q (2,9), q (2,11) . . . q (3,5), q (3,7), q (3,9), q (3,11) . . . in accordance with the position information and volume data is generated.

Next, the image data generation unit 9 of FIG. 1, for example, includes a not shown opacity and tone adjustment unit and a rendering unit. The opacity and tone adjustment unit reads out volume data stored in the volume data generation unit 8 and sets opacity and tone of voxels of the read out volume data. On the other hand, the rendering unit renders the volume data on the basis of opacity and tone set by the opacity and tone adjustment unit and generates volume rendering images.

The display unit 10 includes a not shown display data generation unit, conversion unit and monitor. The display data generation unit generates data for display from 3-dimension image data or 2-dimension image data generated by image data generation unit 9. The generations of the data for display is executed by scan conversion in accordance with predetermined format of display. The conversion unit executing an A/D conversion to the supplied data for display and TV format conversion. The monitor displays the data converted by the conversion unit.

The input unit 12 includes an operation panel which has a display panel, a key board, a track ball, a mouse, a selection button, input button and so on provided thereon. An operator inputs information of the subject, acquiring conditions for volume data, display conditions or some kind of command signal.

Furthermore, the system control unit 13 includes a not shown CPU and a memory. The information inputted from the input unit 12 by the operator is stored in the memory. The CPU wholly controls each unit mentioned above on the basis of the stored information.

Next, the effect of the synthesizing performed in the synthesizing unit 7 is explained with reference to FIG. 8 and FIG. 9. For example in a case that q (1,5), q (1,7) of the 2-dimensional data s1 and q (2,5), q (2,7) of data s2 is synthesized to Q (1,5), sensitivity A(1,5) and beam bending B(1,5) of the ultrasound data Q (1.5) is expressed by expression (1) qualitatively.

$$A(1,5) = \frac{A1 + A2}{2} \quad (1)$$

$$B(1,5) = \frac{B_- + B_{2-} + B_{2+} + B_+}{4}$$

On the other hand, in a case where q (1,7), q (1,9) of the 2-dimensional data s1 and q (2,7), q (2,9) of data s2 is synthesized to Q (1,7), sensitivity A(1,7) and beam bending B(1,7) of the ultrasound data Q (1.7) is also expressed by expression (1).

In addition, with reference to FIG. 8, no synthesized ultrasound data is synthesized from ultrasound data that is acquired only in the same time phase. This means that all boundary lines of scan lines are affected from time phase difference. This is the same condition as normal single-beam forming.

Thus, the formally known sensitivity unevenness, beam bending, and time phase difference occurring in the multi-beam forming method is eliminated.

(Steps of Generating Image Data)

Next, steps of generating image data in present exemplary embodiment are explained with reference to FIG. 10. In this explanation, volume data is generated on the basis of B mode data acquired from a 3-dimensional region of the subject and volume rendering image data is generated on the basis of the volume data. However, volume data may be generated from color doppler data and surface rendering images, MIP image data or MPR image data may be generated.

Figure 10:
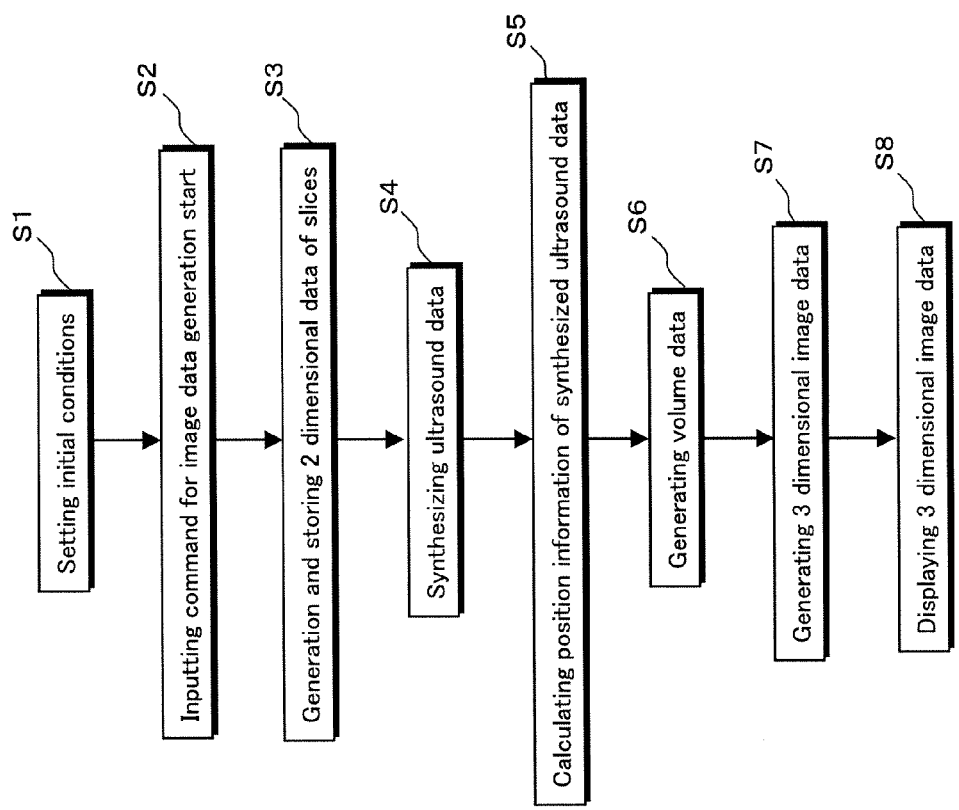
FIG. 10 is a flow chart showing steps of generation of ultrasound data of a first exemplary embodiment of the ultrasound diagnostic apparatus of the invention.

Before generating image data of the subject, the operator of the ultrasound diagnostic apparatus 100 inputs information of the subject using input unit 12 and sets the generation conditions of the volume data or image data (step S1 of FIG. 10).

Next, the operator sets a top of the probe case 41 on the surface of the subject and inputs a command for starting the generation of image data (step S2 of FIG. 10). Supplying the command signal by the system control unit 13 starts the generation of image data.

When image data is generated, rate pulse generation unit 211 of the transmitting unit 21 supplies a rate pulse determining the frequency of the transmitting wave to the delay circuit 212. On the basis of the control signal supplied from transmitting and receiving direction control unit 6, the delay circuit 212 delays the rate pulse for focusing and directing to direction θ4. The delay circuit delivers the delayed signals to the driving circuits. The driving circuit generates driving signals and supplies the driving signal to the array transducers 40. Then ultrasound waves are transmitted in direction θ4.

A part of the transmitted ultrasound waves are reflected from a boundary surface having a difference of acoustic impedance and are received by the array transducers 40. After the A/D converter converts this received signal to a digital signal, the beam former adds the received signal with the delay for focusing and directing to directions θ1, θ3, θ5, θ7.

Next the ultrasound data processing unit 3 generates and stores ultrasound data q (1,1), q (1,3), q (1,5) and q (1,7). In this time, the ultrasound generation unit stores first position data along the slice direction supplied from array transducers detection unit 5 and receives direction information of ultrasound data (θ1, θ3, θ5 and θ7) as the attendant information related to the ultrasound data. When generation and storage of ultrasound data of θ1, θ3, θ5 and θ7 of the first slice is finished, ultrasound data q (1,9), q (1,11), q (1,13) and q (1,15) is generated and stored as in the above-mentioned multibeam forming of transmitting to direction θ12. This data is stored as 2-dimensional data s1 in the data storage unit 71.

When generation and storage of ultrasound data of the 2-dimension data s1 of first slice is finished, the transmitting and receiving direction control unit 6 derivers a probe movement control signal to the probe movement mechanical section 4 on the basis of the instructing signal from the system control unit 13. Then the probe movement mechanical section 4 moves the array transducers 40 to a position of the second slice. Next, system control unit 13 controls the operation so as to transmit ultrasound to directions θ8, θ16 . . . and ultrasound data q (2,5), q (2,7), q (2,9), q (2,11) is generated and stored . . . as in the above-mentioned multibeam forming. The data is stored with its attendant data to data storage unit 71 as 2-dimensional data s2.

Next, in the same manner, ultrasound data q (3,1), q (3,3), q (3,5) . . . of the third slice and ultrasound data q (4,5), q (4,7), q (4,9) . . . is generated sequentially and the data is stored as 2-dimensional data s3, s4, s5 . . . (step S3 of FIG. 10).

As a next step, calculation unit 72 of the data synthesizing unit 7 reads out sets of ultrasound data neighboring each other from the data storage unit 71 and synthesizes the sets of the ultrasound data along slice direction and scan direction on the basis of the respective attendant data (step S4 of FIG. 10).

Furthermore, calculation unit 72 calculates positions of synthesized ultrasound data from position information of the sets of the ultrasound data and delivers the calculated position information to the volume data generation unit 8 with relation to the synthesized ultrasound data (step S5 of FIG. 10). The foregoing synthesizing operation and calculating the position of the synthesized ultrasound data is repeated for all or a part of the stored ultrasound data. The synthesized ultrasound data and its position information is delivered to the volume data generation unit 8. The volume data generation unit 8 arrays and stores in a memory the synthesized ultrasound data delivered from the calculation unit 72 on the basis of the position data which is attendant data of the synthesized ultrasound data. In this manner, the volume data generation unit 8 generates volume data (step S6 of FIG. 10)

Image generating unit 9 includes an opacity and tone adjustment unit for the read out volume data stored in the memory of the volume data generation unit 8 and sets opacity and tone on the basis of the voxel value of the volume data. Image data generation unit 9 also includes a rendering unit to render the volume data 3 dimensional image data on the basis of the opacity and tone set by opacity and tone adjustment unit. The rendering unit generates the volume rendering image data and delivers it to the display unit 10 (step S7 of FIG. 10).

The display unit generates data for display from the volume rendering image data by scan conversion on the basis of the predetermined manner of display. The display unit displays the volume rendering image data (step S8 of FIG. 10).

Figure 11:
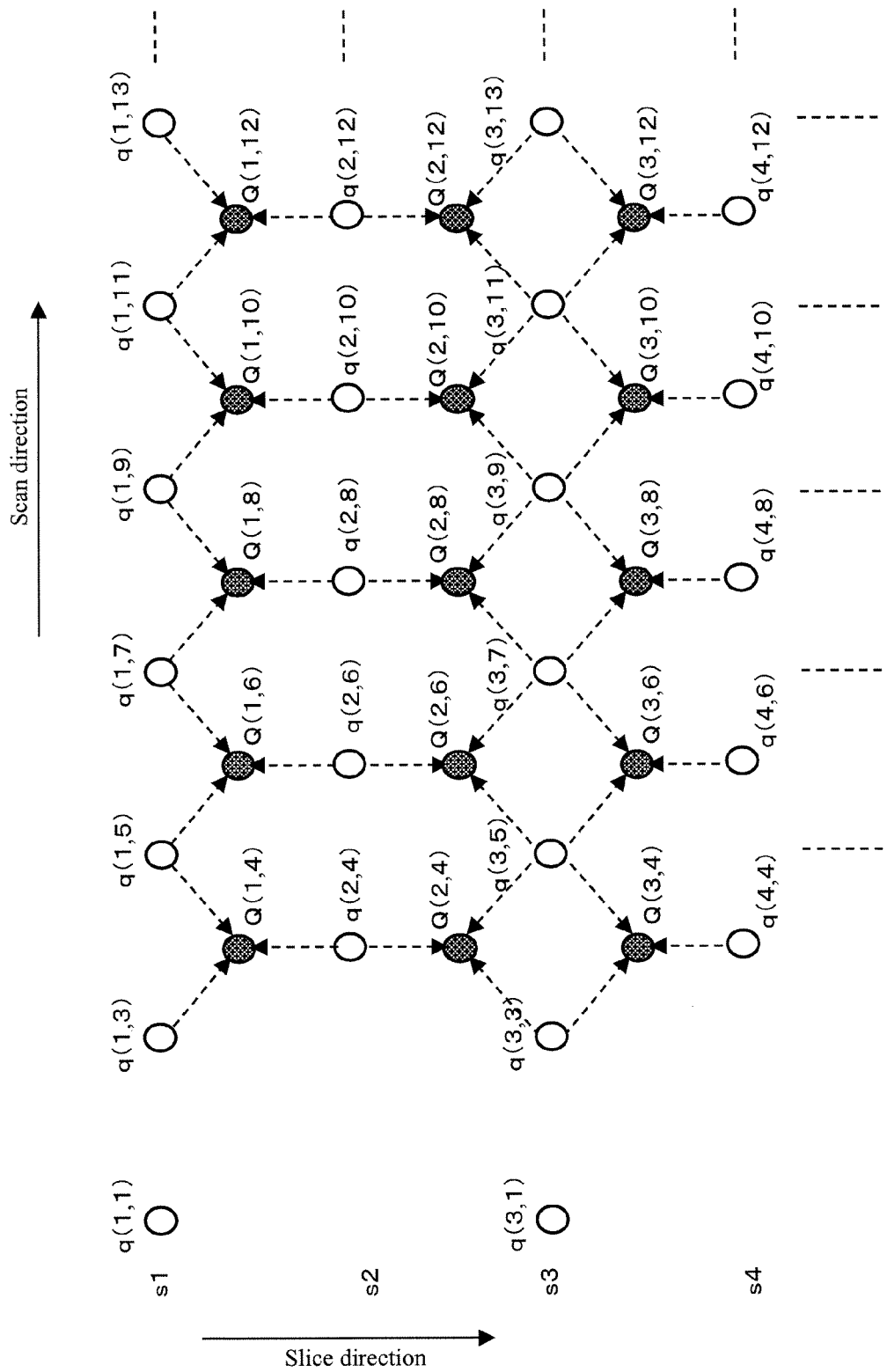
FIG. 11 is a frame format showing another synthesizing processing of ultrasound data of a first exemplary embodiment of the ultrasound diagnostic apparatus of the invention.

The case where the number of beams in the multibeam forming is an odd number is explained above. However, this manner can be adapted to a case where the number of beams in the multibeam forming is an even number. Hereinafter, a case where the number is an even number is explained with reference to FIG. 11.

Two-dimensional data s1 is constructed from ultrasound data q (1,1), q (1,3) and q (1,5) acquired by transmitting along θ3 and from ultrasound data q (1,7), q (1,9) and q (1,11) acquired by transmitting along θ9 . . . . 2-dimensional data s2 neighboring to s1 is constructed from ultrasound data q (2,4), q (2,6) and q (2,8) acquired by transmitting along θ6 and from ultrasound data q (2,10), q (2,12) and q (2,14) acquired by transmitting along θ12 . . . 2-dimensional data s3 neighboring to s2 is constructed from ultrasound data q (3,1), q (3,3) and q (3,5) acquired by transmitting along θ3 . . . s4, s5, s6 are constructed by above mentioned manner.

Calculation unit 72, for example, generates Q (1,4) by reading out and synthesizing sets of ultrasound data of q (1,3), q (1,5) and q (2,4). The ultrasound data Q (2,4) and its' position information is related each other and stored in the memory of volume data generation unit 8. In this manner, the calculation unit 72 also generates ultrasound data Q (2,6) by a synthesizing operation on q (1,5), q (1,7) and q (2,6). Furthermore, in synthesizing data between s2, s3, the position relationship of data is synthesized. Ultrasound data Q (2,4) is generated by a synthesizing operation on q (2,4), q (3,3) and q (3,5), ultrasound data Q (2,6) is generated by a synthesizing operation on q (2,6), q (3,5) and q (3,7) . . . etc. Furthermore, this synthesizing operation is executed between 2-dimensional data s3 and s4, between s4 and s5 . . . etc.

In addition portions of synthesized data of this manner are not equally spaced along the slice direction. If necessary, interpolating may be performed between neighboring sets of ultrasound data so that ultrasound data is equally spaced. In this case, this interpolating may be performed in processing of the 3-dimensional scan conversion along orthogonal coordinate system (U, V, W) of the 3-dimensional space where values are set at intervals (δu, δu, δu).

In this manner, sensitivity and beam bending of the synthesized ultrasound data are also expressed by summation between ultrasound data as mentioned above. This means that the formerly known sensitivity unevenness and beam bending in the multibeam forming method is eliminated. Also no ultrasound data is synthesized from ultrasound data that is acquired only in the same time phase. This is the same condition as normal single-beam forming. This means that formerly known sensitivity unevenness, beam bending, and time phase difference in the multibeam forming method is eliminated.

Second Exemplary Embodiment

Figure 12:
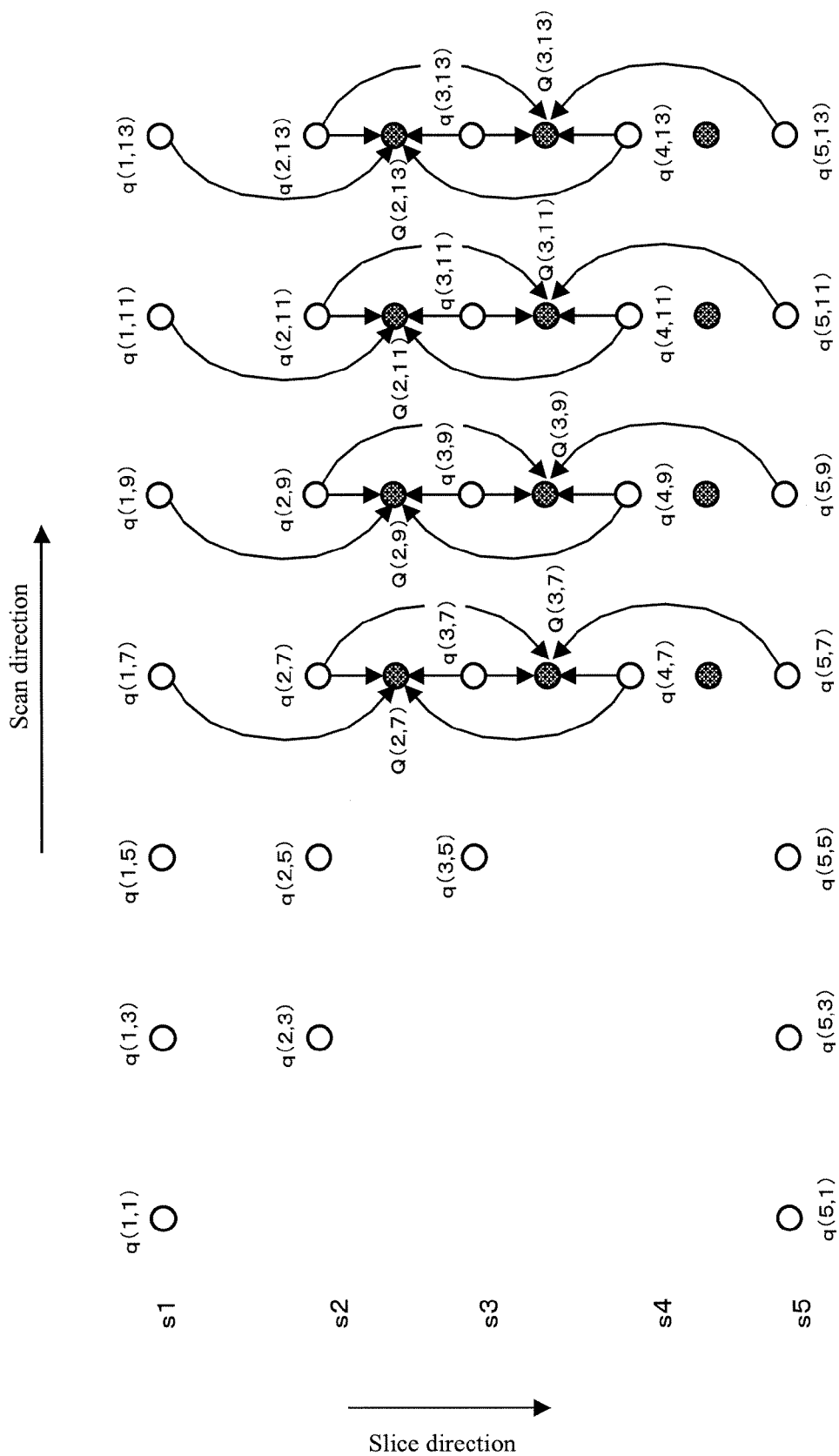
FIG. 12 is a frame format showing synthesizing processing of ultrasound data of a second exemplary embodiment of the ultrasound diagnostic apparatus of the invention.
Figure 13:
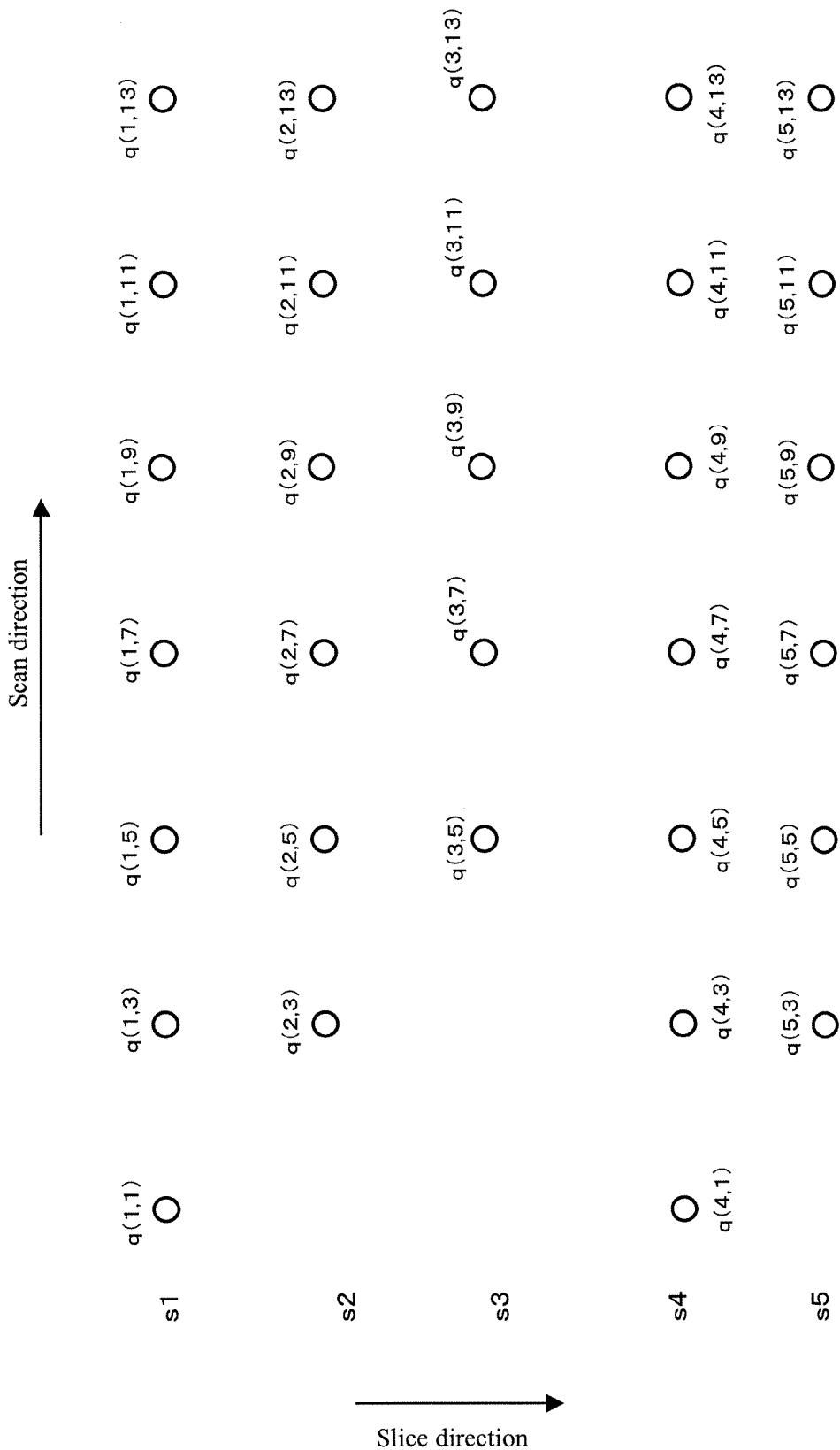
FIG. 13 is a frame format showing another synthesizing processing of ultrasound data of a second exemplary embodiment of the ultrasound diagnostic apparatus of the invention.

Hereinafter, other manners of a synthesizing operation executed by the data synthesizing unit 7 are described with reference to FIG. 12 and FIG. 13. FIG. 12 is a frame format showing a second exemplary embodiment. In this figure, 2-dimensional data s1, which is a first slice, composed from ultrasound data q (1,1), q (1,3), q (1,5) and q (1,7) which is acquired by multibeam forming transmitting in direction θ4 and reception from θ1, θ3, θ5 and θ7 and ultrasound data q (1,9), q (1,11), q (1,13) and q (1,15) which is acquired by multibeam forming transmitting in direction θ12 and reception from θ9, θ11, θ13 and θ15 . . . .

2-dimensional data s2, which is a second slice, is composed from ultrasound data q (2,3), q (2,5), q (2,7) and q (2,9) which is acquired by multibeam forming transmitting in direction θ6 and reception from θ3, θ5, θ7 and θ9 and ultrasound data q (2,11), q (2,13), q (2,15) and q (2,17) which is acquired by multibeam forming of a transmitting to direction θ14 and reception from θ11, θ13, θ15 and θ17 . . . .

Furthermore, 2-dimensional data s3, which is a third slice, is composed from ultrasound data q (3,5), q (3,7), q (3,9) and q (3,11) which is acquired by multibeam forming transmitting in direction θ8 and reception from θ5, θ7, θ9 and θ11 and ultrasound data q (3,13), q (3,15), q (3,17) and q (3,19) which is acquired by multibeam forming transmitting in direction θ16 and reception from θ13, θ15, θ17 and θ19 . . . .

Two-dimensional data s4, which is a fourth slice, is composed from ultrasound data q (4,7), q (4,9), q (4,11) and q (4,13) which is acquired by multibeam forming of a transmitting to direction θ10 and reception from θ7, θ9, θ11 and θ13 . . . .

Furthermore, after the fourth slice, for the fifth to ninth slices and tenth to thirtieth slices . . . , 2-dimensional data s5 to s9 and s10 to s13 . . . is generated in the same manner as in the case of generating 2-dimension data s1 to s4 on the first to fourth slices.

Next calculation unit 72 in the data synthesizing unit 7 reads out ultrasound data q (1,7), q (2,7), q (3,7) and q (4,7) which is ultrasound data corresponding to θ7 of 2-dimensional data s1, s2, s3 and s4. Then by the synthesizing of this ultrasound data, the calculation unit 72 generates ultrasound data Q (2,7) synthesizes and calculates a center position between q (1,7), q (2,7), q (3,7) and q (4,7) on the basis of position information attended to the ultrasound data q (1,7), q (2,7), q (3,7) and q (4,7). Ultrasound data Q (2,7) is related to its' position information and stored in the memory of volume data generation unit 8. The synthesizing is also simply averaging or adding in this exemplary embodiment. However, the synthesizing may be weighted mean. For example, q (2,7) and q (3,7) may be more weighted than q (1,7) and q (4,7) for sharpness of acquired image. However simply averaging or adding is more suitable for reduction of the effects of beam bending or sensitivity unevenness.

In a same manner, the calculation unit 72 sequentially calculates Q (2,9) from q (1,9), q (2,9), q (3,9) and q (4,9) . . . ; Q (2,11) from q (1,11), q (2,11), q (3,11) and q (4,11); Q (3,7) from q (2,7), q (3,7), q (4,7) and q (5,7) . . . ; Q (3,9) from q (2,9), q (3,9), q (4,9) and q (5,9) . . . ; Q (4,7) from q (3,7), q (4,7), q (5,7) and q (6,7) . . . .

In this manner sensitivity and beam bending of the synthesized ultrasound data are also expressed by summation between ultrasound data as mentioned above. This means that formerly known sensitivity unevenness and beam bending by the multibeam forming method are eliminated. Also no ultrasound data is synthesized from ultrasound data that is acquired only in the same time phase. This is the same condition as normal single-beam forming. This means that the formerly known sensitivity unevenness, beam bending, and time phase difference in the multibeam forming method is eliminated.

In the where case the number of beams in the multibeam forming is an odd number is explained above. However, the second exemplary embodiment can be adapted to a case where the number of beams in the multibeam forming is an even number. Hereinafter, a case where number of beams is an even number is explained with the reference to FIG. 13.

Two-dimensional data s1 is constructed from ultrasound data q (1,1), q (1,3) and q (1,5) acquired by transmitting along θ3 and from ultrasound data q (1,7), q (1,9) and q (1,11) acquired by transmitting along θ9 . . . . 2-dimensional data s2 neighboring to s1 is constructed from ultrasound data q (2,3), q (2,5) and q (2,7) acquired by transmitting along θ5 and from ultrasound data q (2,9), q (2,11) and q (2,13) acquired by transmitting along θ11 . . . . 2-dimensional data s3 neighboring to s2 is constructed from ultrasound data q (3,5), q (3,7) and q (3,9) acquired by transmitting along θ7 . . . s4, s5, s6 is constructed by above mentioned manner.

Next calculation unit 72 in the data synthesizing unit 7 reads out ultrasound data q (1,5), q (2,5) and q (3,5) which is ultrasound data corresponding to θ5 of 2-dimensional data s1, s2 and s3. Then by the synthesizing of this ultrasound data, calculation unit 72 generates ultrasound data Q (2,5) and calculates a center position on the basis of position information attended to the ultrasound data. Ultrasound data Q (2,5) is related to its' position information and stored in the memory of volume data generation unit 8. In the same manner, calculation unit 72 sequentially calculates Q (2,7) from q (1,7), q (2,7) and q (3,7) . . . ; Q (2,9) from q (1,9), q (2,9) and q (3,9); Q (3,5) from q (2,5), q (3,5) and q (4,7) . . . ; Q (4,5) from q (4,5), q (3,5) and q (4,5) . . . .

In this manner, sensitivity and beam bending of the synthesized ultrasound data are also expressed by the summation between ultrasound data as mentioned above. This means that the formerly known sensitivity unevenness and beam bending in the multibeam forming method is eliminated. Also no ultrasound data is synthesized from ultrasound data that is acquired only in the same time phase. This is the same condition as in normal single-beam forming. This means that the formerly known sensitivity unevenness, beam bending, and time phase difference in the multibeam forming method is eliminated.

In addition, compared to the case of 4-beam multibeam forming, there is a number of sets of ultrasound data that are not synthesized. In the manner shown in FIG. 12, 12 sets of ultrasound data (q(1,1), q(1,3) q(1,5), q(2,3), q(2,5), q(3,5), q(1,n−4), q(2,n−4), q(2,n−2), q(3,n−4), q(3,n−2) and q (3,n) (n is an end number along the scan direction)) are not synthesized and not used in 2-dimensional data s1 to s4. However, in the manner shown in FIG. 13, the number of sets of ultrasound data that are not synthesized and not used in is 6 (q (1,1), q (1,3), q (2,3), q (1,n−2), q (2,n−2) and q (2,n)) in 2-dimensional data s1 to s3.

Furthermore, in such a manner, the second exemplary embodiment can be adapted to cases of a number of beams for multibeam forming where the number is more than 1.

Third Exemplary Embodiment

Figure 14:
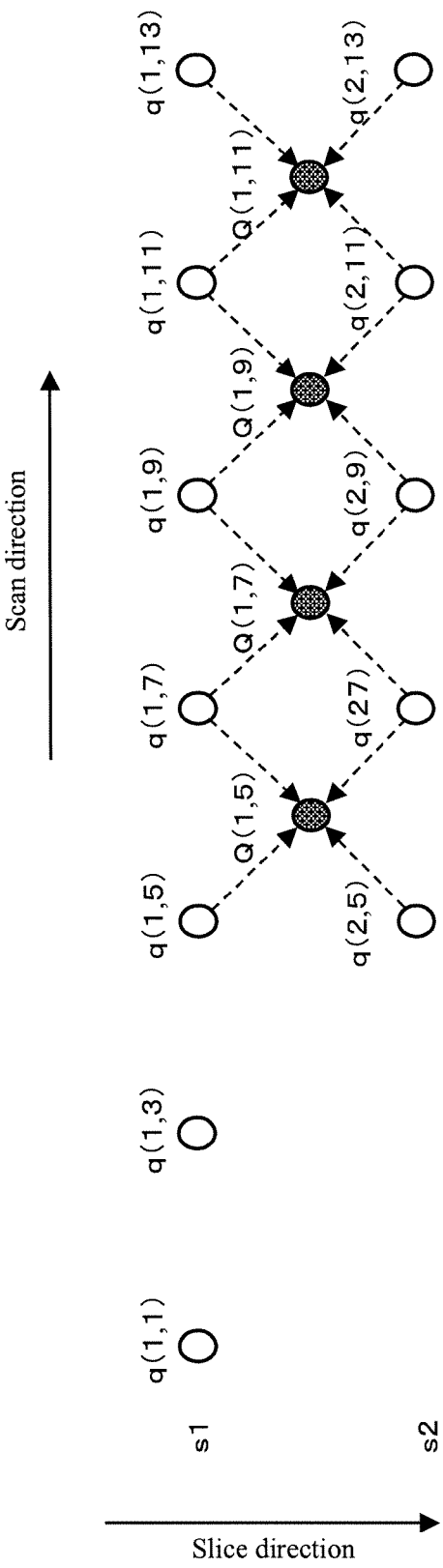
FIG. 14 is a frame format showing synthesizing processing of ultrasound data of a third exemplary embodiment of the ultrasound diagnostic apparatus of the invention.

Hereinafter, another manner of the synthesizing operation executed by the data synthesizing unit 7 is described with reference to FIG. 14. FIG. 14 is a frame format showing a third exemplary embodiment. This exemplary embodiment makes it possible to generate 2-dimensional images that eliminate the effect of beam bending, sensitivity unevenness and time phase difference.

In this exemplary embodiment, 2-dimensional data s1 and s2 are acquired in same manner as the first exemplary embodiment shown in FIG. 9. However, 2-dimensional data s3, s4, s5 . . . are not acquired. Then, the synthesized ultrasound data is generated about only one slice.

In this manner, formerly known sensitivity unevenness, beam bending, and time phase difference in the multibeam forming method is eliminated. In addition, compared to the formerly known 2-beam multibeam forming, the frame rate is same. Furthermore, 2-beam multibeam forming has no sensitivity unevenness. However, the third exemplary embodiment has an effect of eliminating beam bending and time phase difference by comparison to 2-beam multibeam forming.

Fourth Exemplary Embodiment

Figure 15:
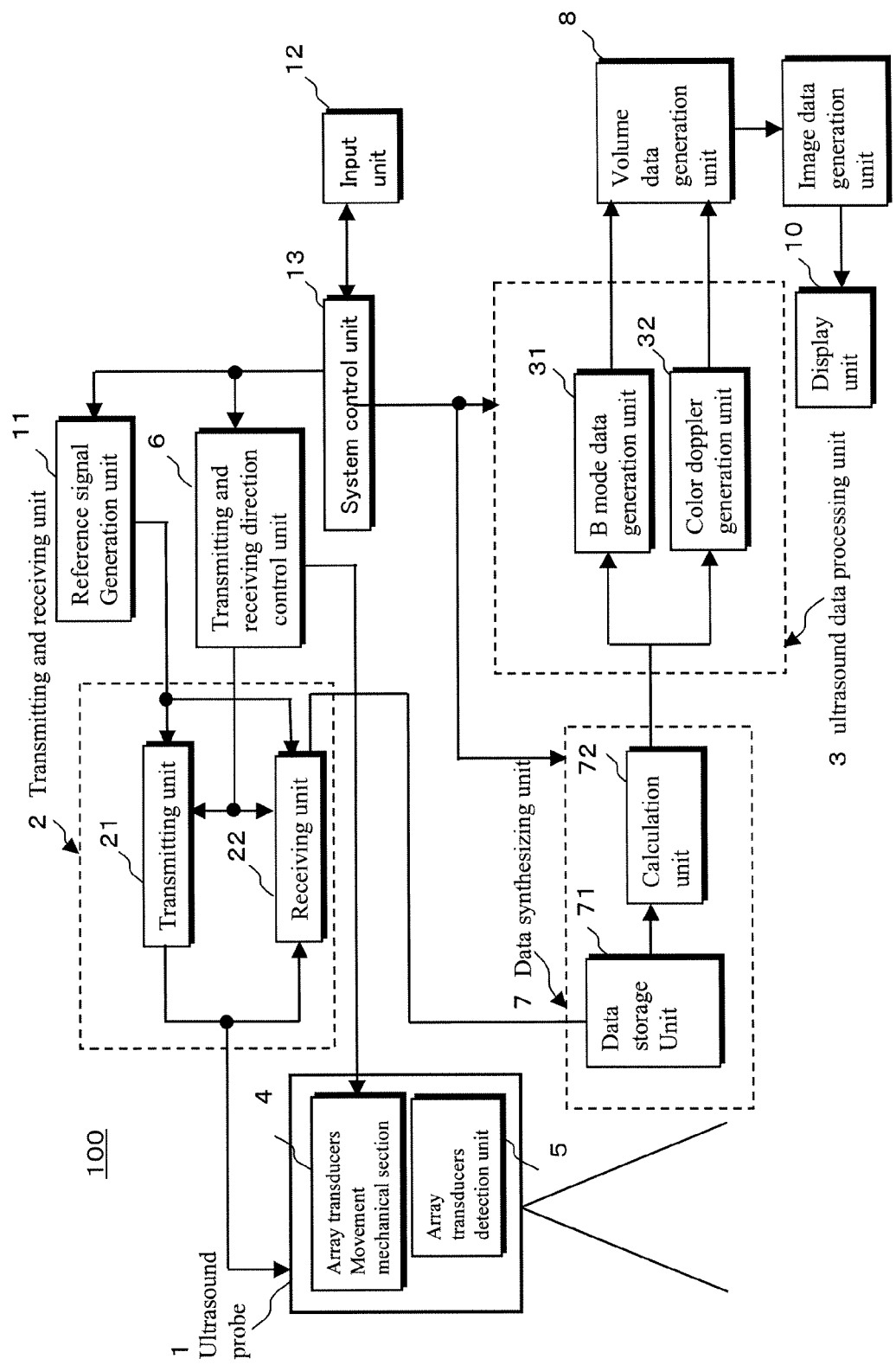
FIG. 15 is a block diagram showing whole components of a fourth exemplary embodiment of the ultrasound diagnostic apparatus of the invention.

In above mentioned exemplary embodiment, the data synthesizing unit 7 synthesizes data from the ultrasonic data processing unit 3. However, present invention is not limited in this manner. For example, the data synthesizing unit 7 may execute the above-mentioned synthesizing operation to complex received signals supplied from the transmitting and receiving unit 2 as shown in FIG. 15. When the ultrasound data processing unit 3 generates ultrasound data from the complex receiving signal synthesized in the data synthesizing unit 7, the effect explained above is realized. Furthermore, because the synthesized receiving signal has phase information, more proper adjustment can be executed, especially for beam bending.

Fifth Exemplary Embodiment

In above mentioned exemplary embodiment, the case where 1-dimensional sector array transducers are oscillated and acquire volume data is mainly explained. However, in a fifth exemplary embodiment, volume data is acquired by a 2-dimensional array probe. In this case, by one transmitting and receiving operation using multibeam forming, ultrasound data can be acquired for a 3-dimensional region.

Figure 16:
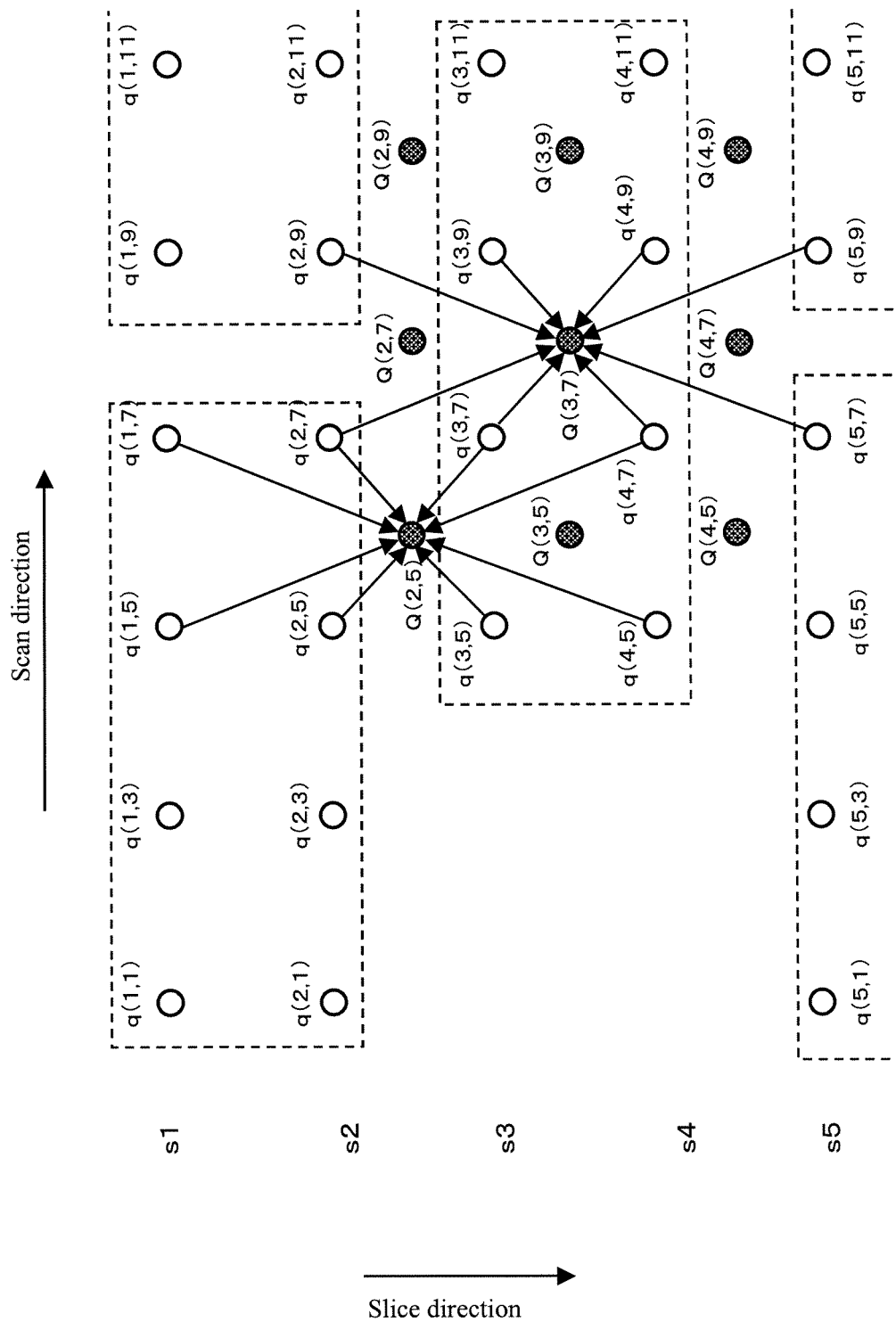
FIG. 16 is a frame format showing synthesizing processing of ultrasound data of a fifth exemplary embodiment of the ultrasound diagnostic apparatus of the invention.
Figure 17:
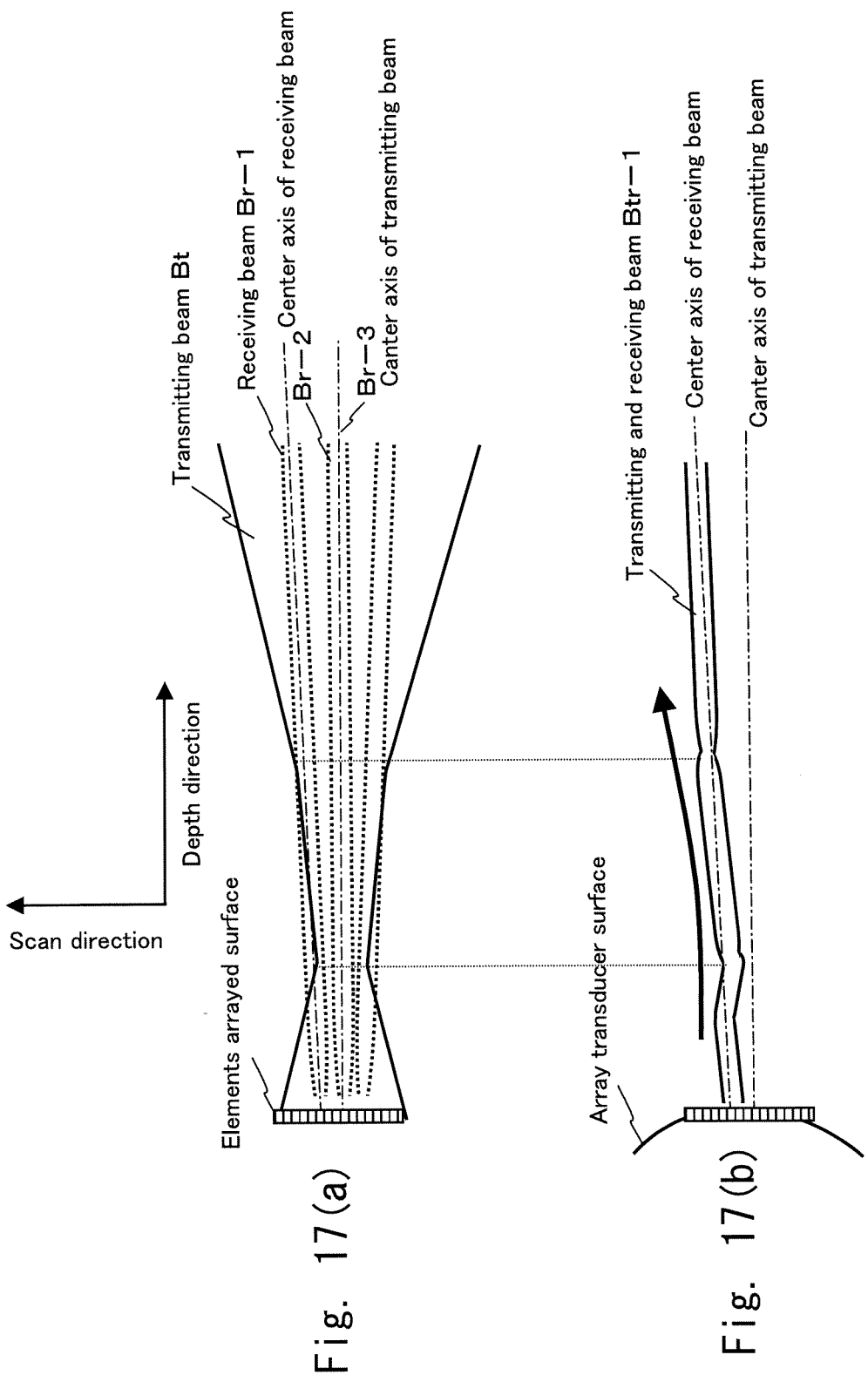
FIGS. 17(a) and 17(b) are frame formats showing beam bending of ultrasound data of the ultrasound diagnostic apparatus of the prior art.
Figure 18:
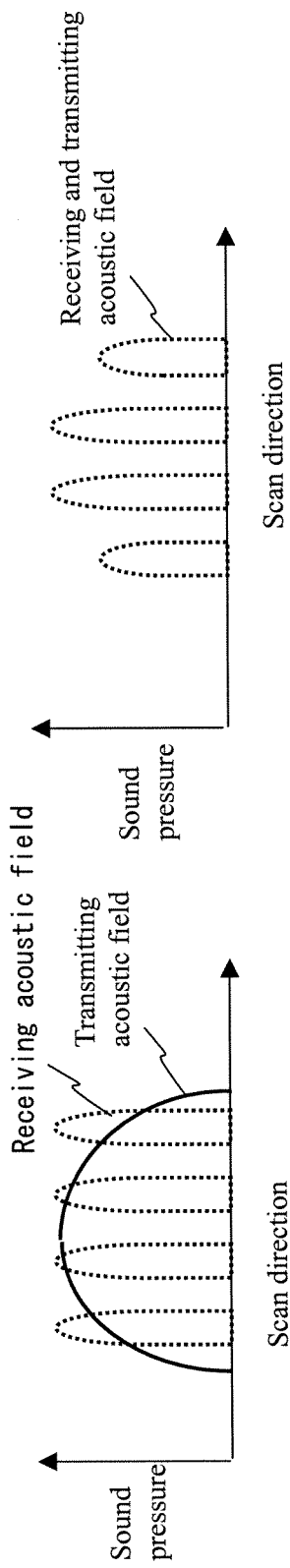
FIG. 18 is a frame format showing sensitivity unevenness of ultrasound data of the ultrasound diagnostic apparatus of the prior art.

FIG. 16 is a frame format showing a fifth exemplary embodiment. In this figure, 2-dimensional data s1 and s2 are composed from ultrasound data q (1,1), q (1,3), q (1,5), q (1,7) q (2,1), q (2,3), q (2,5) and q (2,7) which is acquired by multibeam forming transmitting in direction θ4 being a center direction between s1 and s2 and reception from θ1, θ3, θ5 and θ7 of s1 and s2 and ultrasound data q (1,9), q (1,11), q (1,13), q (1,15), q (2,9), q (2,11), q (2,13) and q (2,15) which is acquired by multibeam forming transmitting in direction θ12 being a center direction between s1 and s2 and reception from θ9, θ11, θ13 and θ15 of s1 and s2 . . . .

On the other hand, 2-dimensional data s3 and s4 are composed from ultrasound data q (3,5), q (3,7), q (3,9), q (3,11), q (4,5), q (4,7), q (4,9) and q (4,11) which is acquired by multibeam forming transmitting in direction θ8 being a center direction between s3 and s4 and reception from θ5, θ7, θ9 and θ11 of s3 and s4 and ultrasound data q (3,13), q (3,15), q (3,17), q (3,19) q (4,13), q (4,15), q (4,17) and q (4,19) which is acquired by multibeam forming transmitting in direction θ16 being a center direction between s3 and s4 and reception from θ13, θ15, θ17 and θ19 of s3 and s4 . . . .

Furthermore, 2-dimensional data s5 to s9 and s10 to s13 . . . is generated in the same manner of the case of generating 2-dimension data s1 to s4.

Next, calculation unit 72 in the data synthesizing unit 7 reads out ultrasound data q (1,7), q (2,7), q (3,7), q (4,7) which is ultrasound data corresponding to θ7 of 2-dimensional data s1, s2, s3 and s4 and q (1,9), q (2,9), q (3,9) and q (4,9) which is ultrasound data corresponding to θ7 of 2-dimensional data s1, s2, s3 and s4. Then by the synthesizing this ultrasound data, calculation unit 72 generates ultrasound data Q (2,5) and calculates a center position between q (1,7), q (2,7), q (3,7) q (4,7), q (1,9), q (2,9), q (3,9) and q (4,9) on the basis of position information attended to the ultrasound data. The ultrasound data Q (2,5) and its' position information is related each other and stored in the memory of volume data generation unit 8.

In a same manner, calculation unit 72 sequentially calculates Q (2,7) from q (1,7), q (2,7), q (3,7), q (4,7) q (1,9), q (2,9), q (3,9) and q (4,9) . . . ; Q (3,7) from q (2,7), q (3,7), q (4,7), q (5,7), q (2,9), q (3,9), q (4,9) and q (5,9) . . . .

In this manner, sensitivity, beam bending, of the synthesized ultrasound data is also expressed by summation between ultrasound data as mentioned above. This means that formerly known sensitivity unevenness and beam bending in the multibeam forming method is eliminated. Also no ultrasound data is synthesized from ultrasound data that is acquired only in the same time phase. This is the same condition as normal single-beam forming. This means that the formerly known sensitivity unevenness, beam bending, and time phase difference in the multibeam forming method is eliminated.

Numerous variations of the present invention are possible in light of the above description. It is therefore to be understood that the invention as claimed can be practiced other than is specifically described herein.

What is claimed is:

1. An ultrasound diagnostic apparatus comprising:
   an ultrasound probe configured to transmit toward and receive ultrasound signals from a three-dimensional region of a subject over a plurality of slices having different slice directions;
   a transmitting and receiving unit having a beamformer configured to acquire ultrasound data by a plurality of executions of multibeam forming using the beamformer, the ultrasound data comprising a plurality of sets of ultrasound data along a plurality of directions by a one-time transmitting and receiving operation of the ultrasound probe for each of the plurality of slices;
   processing circuitry having a data storage to store said ultrasound data, configured to:
   generate a plurality of sets of synthesized ultrasound data using the ultrasound data acquired during each of said executions, each of the sets of synthesized ultrasound data being acquired along a respective plurality of different receiving directions with respect to a transmitting direction over at least two of the slices, and
   generate image data on the basis of the synthesized ultrasound data; wherein
   the transmitting and receiving unit executes a plurality of scans along a scan direction which is essentially perpendicular to a direction of ultrasound transmitting, the scans being performed in different slice directions which are essentially perpendicular to the scan direction;
   the processing circuitry is configured to synthesize sets of ultrasound data relating to different scans and generate the synthesized ultrasound data,
   the transmitting and receiving unit scans a first slice by repeating four-beam multibeam forming having a predetermined spread along the scan direction and to scan a second slice by repeating said four-beam multibeam forming, the scan of said second slice being started from a scan position located one half of the predetermined spread from a start position of the scan of the first slice; and
   the processing circuitry is configured to synthesize 2 sets of ultrasound data for the multibeam forming of the first slice and synthesize 2 sets of ultrasound data for the multibeam forming of the second slice, the 2 sets of ultrasound data corresponding to the second slice relating to directions having essentially a same scan direction component as directions relating to the 2 sets of ultrasound data corresponding to the first slice.

2. The ultrasound diagnostic apparatus according to claim 1, further comprising:
   the transmitting and receiving unit performing multibeam forming in accordance with the scan direction and a slice direction which are perpendicular to a direction of ultrasound transmitting so that angular components of both the scan direction and the slice direction of neighboring two transmitting directions are different from each other.

3. The ultrasound diagnostic apparatus according to claim 1, wherein:
   the transmitting and receiving unit repeats transmitting and receiving for multibeam forming of n beams having a predetermined spread along the scan direction with respect to n slices, the n slices being respectively scanned from a direction varied by 1/n of the predetermined spread along the scan direction; and
   the processing circuitry is configured to synthesize n sets of ultrasound data of the n slices each relating to a direction having essentially same scan direction component.

4. The ultrasound diagnostic apparatus according to claim 1, wherein the ultrasound probe comprises:
   array transducers arrayed along the scan direction; and
   a mechanical oscillator configured to oscillate the array transducers in a slice direction.

5. The ultrasound diagnostic apparatus according to claim 1, wherein:
   the ultrasound probe is a 2-dimensional array probe which has 2-dimensionally arrayed array transducers.

6. The ultrasound diagnostic apparatus according to claim 1, wherein the processing circuitry further comprises:
   an envelope detector and an autocorrelation calculator, configured to execute image processing which includes envelope detection and autocorrelation processing to ultrasound data outputted from the transmitting and receiving unit; wherein
   the processing circuitry is configured to synthesize ultrasound data upon which said image processing is performed.

7. The ultrasound diagnostic apparatus according to claim 1, wherein the processing circuitry further configured to:
   execute image processing which includes envelope detection and autocorrelation processing to ultrasound data; and
   synthesize ultrasound data using said ultrasound data upon which said image processing is performed.

8. The ultrasound diagnostic apparatus according to claim 1, wherein:
   said processing circuitry is configured to synthesize the plurality of sets of data, each using ultrasound data from the respective first and second slices, said ultrasound data from said second slice shifted in the scan direction relative to the ultrasound data from the first slice.

9. The ultrasound diagnostic apparatus according to claim 1, wherein:
   said processing circuitry is configured to synthesize the plurality of sets of data, each using ultrasound data from the respective first and second slices, the ultrasound data in the first and second slices each having first data formed at inner receiving directions adjacent to the transmitting direction and second data formed at outer receiving directions located farther away from the transmitting direction, the ultrasound data from said first slice being shifted in the scan direction with respect to the ultrasound data in said second slice such that first data in the first slice is aligned in the scan direction with second data in the second slice and second data in the first slice is aligned in the scan direction with first data in the second slice.

10. A method of acquiring ultrasound data comprising:
transmitting and receiving an ultrasonic signal using an ultrasound probe having array transducers toward and from a three-dimensional region of a subject;
acquiring ultrasound data by a plurality of executions of multibeam forming, the ultrasound data comprising a plurality of sets of ultrasound data along a plurality of directions by a one-time transmitting and receiving operation for each of a plurality of slices having different slice directions;
synthesizing a plurality of sets of synthesized data using the ultrasound data acquired during said executions, each of the sets of synthesized data being acquired along a respective plurality of different receiving directions with respect to a transmitting direction over at least two of the slices; and
generating image data on the basis of the synthesized ultrasound data, wherein
the transmitting and receiving comprises executing a plurality of scans along a scan direction which is essentially perpendicular to a direction of ultrasound transmitting, the scans being performed in different slice directions which are essentially perpendicular to the scan direction,
the data synthesizing includes synthesizing sets of synthesized ultrasound data relating to different scans,
the transmitting and receiving comprises scanning a first slice by repeating four-beam multibeam forming having a predetermined spread along the scan direction and scanning a second slice by repeating said four-beam multibeam forming, wherein scanning the second slice starts at a position located a half of the predetermined spread from a start position of the first slice, and
synthesizing ultrasound data comprises synthesizing 2 sets of ultrasound data for one multibeam forming of the first slice and synthesizing 2 sets of ultrasound data for one multibeam forming of the second slice, the 2 sets of the ultrasound data corresponding to the second slice relating to directions having essentially same scan direction component as directions relating to the 2 sets of the ultrasound data corresponding to the first slice.

11. The method of acquiring ultrasound data according to claim 10, further comprising:
controlling directions for the multibeam forming in accordance with the scan direction and a slice direction which are perpendicular to a direction of ultrasound transmitting so that angular components of both the scan direction and the slice direction of two neighboring transmitting directions are different from each other.

12. The method of acquiring ultrasound data according to claim 10, wherein:
transmitting and receiving comprises transmitting and receiving n beams having a predetermined spread along the scan direction toward and from n slices, the n slices being scanned from a direction varied by 1/n of the predetermined spread along the scan direction; and
the synthesizing ultrasound data comprises synthesizing n sets of ultrasound data of the n slices each relating to a direction having essentially a same scan direction component.

13. The method of acquiring ultrasound data according to claim 10, wherein:
transmitting and receiving comprises using array transducers arrayed along the scan direction and oscillating the array transducers in a slice direction.

14. The method of acquiring ultrasound data according to claim 10, wherein:
transmitting and receiving using a 2-dimensional array probe that has 2-dimensional arrayed array transducers.

15. The method of acquiring ultrasound data according to claim 10, further comprising;
executing image processing comprising envelope detection and autocorrelation processing to ultrasound data outputted by the transmitting and receiving step; wherein
synthesizing ultrasound data comprises synthesizing ultrasound data outputted by the image processing.

16. The method of acquiring ultrasound data according to claim 10, further comprising:
executing image processing comprising envelope detection and autocorrelation processing to ultrasound data outputted by the synthesizing ultrasound data step; wherein
the step of synthesizing ultrasound data comprises synthesizing ultrasound data outputted by the transmitting and receiving step.

17. The method of acquiring ultrasound data according to claim 10, wherein:
synthesizing said plurality of sets of data comprises each using ultrasound data from the respective first and second slices, said ultrasound data from said second slice shifted in the scan direction relative to the ultrasound data from the first slice.

18. The method of acquiring ultrasound data according to claim 10, comprising synthesizing the plurality of sets of data, each using ultrasound data from the respective first and second slices, the ultrasound data in the first and second slices each having first data formed at inner receiving directions adjacent to the transmitting direction and second data formed at outer receiving directions located farther away from the transmitting direction, the ultrasound data from said first slice being shifted in the scan direction with respect to the ultrasound data in said second slice such that first data in the first slice is aligned in the scan direction with second data in the second slice and second data in the first slice is aligned in the scan direction with first data in the second slice.

19. A method of acquiring ultrasound data comprising:
transmitting a first and a second plurality of ultrasonic signals toward a subject along a scanning direction over respective first and second slices having different slice directions using an ultrasound probe having array transducers;
acquiring ultrasonic data from each of a second plurality of different directions along said scanning direction for each of said first and second plurality of ultrasonic signals, to form a first and a second plurality of sets of data;
synthesizing the ultrasonic data to produce synthesized ultrasound data using ultrasonic data from both of said first and second plurality of sets of data; and
generating image data on the basis of the synthesized ultrasound data, wherein
transmitting comprises scanning a first slice by repeating four-beam multibeam forming having a predetermined spread along the scanning direction and scanning a second slice by repeating said four-beam multibeam forming, wherein scanning the second slice starts at a position located a half of the predetermined spread from a start position of the first slice; and synthesizing ultrasound data comprises synthesizing 2 sets of ultrasound data for one multibeam forming of the first slice and synthesizing 2 sets of ultrasound data for one multibeam forming of the second slice, the 2 sets of the ultrasound data corresponding to the second slice relating to directions having essentially same scanning direction component as directions relating to the 2 sets of the ultrasound data corresponding to the first slice.

20. The method of acquiring ultrasound data according to claim 19, comprising:

controlling directions of said plurality of ultrasonic signals in accordance with said scanning direction and a slice direction such that angular components of both the scanning direction and the slice direction of two neighboring transmitting directions are different from each other.

21. The method of acquiring ultrasound data according to claim 20, wherein:

controlling directions comprises controlling n ultrasonic signals having a predetermined spread along the scanning direction toward and from n slices, the n slices being scanned from a direction varied by 1/n of the predetermined spread along the scanning direction; and synthesizing the ultrasound data comprises synthesizing n sets of ultrasound data of the n slices each relating to a direction having essentially a same scanning direction component.

* * * * *